United States Patent
Chen et al.

(10) Patent No.: US 10,853,563 B1
(45) Date of Patent: Dec. 1, 2020

(54) METHOD AND SYSTEM FOR CONFIGURING FORM FILLING APPLICATION TO MINIMIZE FORM FILLING EFFORT

(71) Applicant: MOVEWORKS, INC., Mountain View, CA (US)

(72) Inventors: Jing Chen, Redwood City, CA (US); Dongxu Zhou, Redwood City, CA (US); Ahmed Al-Bahar, Mountain View, CA (US); Jiang Chen, Fremont, CA (US)

(73) Assignee: MOVEWORKS, INC., Mountain View, CA (US)

( * ) Notice: Subject to any disclaimer, the term of this patent is extended or adjusted under 35 U.S.C. 154(b) by 0 days.

(21) Appl. No.: 15/929,287

(22) Filed: Apr. 22, 2020

(51) Int. Cl.
  *G06F 40/174* (2020.01)
  *G06F 16/22* (2019.01)
  *G06F 3/0484* (2013.01)
  *G06N 20/00* (2019.01)
  *G06Q 10/10* (2012.01)
  *G06Q 10/06* (2012.01)

(52) U.S. Cl.
  CPC .......... *G06F 40/174* (2020.01); *G06F 3/0484* (2013.01); *G06F 16/2228* (2019.01); *G06N 20/00* (2019.01); *G06Q 10/067* (2013.01); *G06Q 10/10* (2013.01)

(58) Field of Classification Search
  CPC .... G06F 40/174; G06F 16/2228; G06F 30/20; G06F 3/0484; G06N 20/00; G06Q 10/067; G06Q 10/10

USPC .......................................................... 715/224
See application file for complete search history.

(56) References Cited

U.S. PATENT DOCUMENTS

| | | | |
|---|---|---|---|
| 5,704,029 A | 12/1997 | Wright, Jr. | |
| 9,052,851 B1* | 6/2015 | Varga | G06F 3/1208 |
| 9,961,070 B2* | 5/2018 | Tang | H04L 63/0853 |
| 10,437,920 B2* | 10/2019 | Feng | G06Q 50/14 |
| 10,673,836 B2* | 6/2020 | Tang | H04L 63/0861 |
| 2003/0163782 A1 | 8/2003 | Owen | |
| 2004/0029092 A1* | 2/2004 | Orr | G09B 7/02 |
| | | | 434/354 |
| 2004/0205526 A1* | 10/2004 | Borodovski | G06F 40/174 |
| | | | 715/224 |
| 2008/0120257 A1 | 5/2008 | Goyal et al. | |
| 2008/0184102 A1* | 7/2008 | Selig | G06F 40/174 |
| | | | 715/234 |

(Continued)

OTHER PUBLICATIONS

Q-function; Apr. 7, 2019; Wikipedia.com; 4 pages.*

(Continued)

*Primary Examiner* — Andrew R Dyer
(74) *Attorney, Agent, or Firm* — Ascenda Law Group, PC

(57) ABSTRACT

A form filling application is configured to minimize the form filling effort of a user. The configuration follows concepts from reinforcement learning, and includes optimizing a policy for selecting agent actions in a manner that maximizes a reward signal. In the context of the form filling application, an agent action may specify one or more slots of the form for the user to fill, and further specify one or more user interfaces for filling the specified one or more slots. The reward signal may be defined as an inverse function of the user effort, so that maximizing the reward signal has the desired effect of minimizing the user effort.

20 Claims, 17 Drawing Sheets

(56) References Cited

U.S. PATENT DOCUMENTS

| | | | | |
|---|---|---|---|---|
| 2008/0235263 | A1* | 9/2008 | Riaz | G06F 40/174 |
| 2010/0017868 | A1* | 1/2010 | Hao | H04L 67/2819 726/11 |
| 2011/0264648 | A1* | 10/2011 | Gulik | G06F 16/9535 707/722 |
| 2015/0086115 | A1* | 3/2015 | Danko | G06K 9/6201 382/190 |
| 2015/0106788 | A1* | 4/2015 | Danko | G06F 11/3688 717/124 |
| 2017/0078270 | A1* | 3/2017 | Tang | H04L 63/0815 |
| 2018/0060290 | A1* | 3/2018 | Feng | G06F 40/58 |
| 2018/0255049 | A1* | 9/2018 | Tang | H04L 63/123 |
| 2019/0311132 | A1* | 10/2019 | Arnoth | H04L 63/1416 |
| 2019/0340466 | A1* | 11/2019 | Berseth | G06K 9/6276 |

OTHER PUBLICATIONS

"11.3.6 On-Policy Learning", Artificial Intelligene: Foundations of Computational Agents, Cambridge University Press (2017), downloaded Dec. 31, 2019 from: https://artint.info/html/ArtInt_268.html, 3 pages.

Ali; et al., "Predictive Models of Form Filling", Computer Science (2009), 8 pages.

Chandramohan, Senthilkumar, "Revisiting user simulation in dialogue systems : do we still need them ? : will imitation play the role of simulation ?", Universit'e d'Avignon, Thesis paper (Sep. 2012), pp. 1-165.

Chen, Kuang, "Data-driven Techniques for Improving Data Collection in Low-resource Environments", Dissertation (2011), University of California, Berkeley, 101 pages.

Chen; et al., "Usher: Improving Data Quality with Dynamic Forms", IEEE Transactions on Knowledge and Data Engineering (2010), pp. 1-16.

Gao; et al., "Neural Approaches to Conversational AI: Question Answering, Task-Oriented Dialogues and Social Chatbots", Foundations and Trends in Information Retrieval (2019), arXiv:1809.08267v3 [cs.CL], 95 pages.

Khare; et al., "Understanding Deep Web Search Interfaces: A Survey", SIGMOD Record (Mar. 2010, 39(1):33-40.

Peitquin; et al., "Sample Efficient On-line Learning of Optimal Dialogue Policies with Kalman Temporal Differences" IJCAI 2011, hal-00618252, version 1—Sep. 1, 2011, Barcelona Spain, 6 pages.

Philips, Miklos, "The End of Web Forms", Toptal, downloaded Dec. 15, 2019 from: https://www.toptal.com/designers/ux/end-of-web-forms-conversational-uis-chatbots, 40 pages.

Schatzmann; et al., "A Survey of Statistical User Simulation Techniques for Reinforcement-Learning of Dialogue Management Strategies", The Knowledge Engineering Review (Jun. 2006), 33 pages.

Scheffler; et al., "Automatic learning of dialogue strategy using dialogue simulation and reinforcement learning", Proceedings of the second international conference on Human Language Technology Research (2002), 7 pages.

Sutton; et al., "Reinforcement Learning: An Introduction", The MIT Press (1998), second edition, 548 pages.

Toda; et al., "A Probabilistic Approach for Automatically Filling Form-Based Web Interfaces", Proceedings of the VLDB Endowment, Aug. 29-Sep. 3, 2011, 4(3):151-160.

Troiano, Luigi, "Web Form Page in Mobile Devices: Optimization of Layout with a Simple Genetic Algorithm", Proceedings of the 11th International Conference on Enterprise Information Systems (May 6-10, 2009), vol. HCI, Milan, Italy, 6 pages.

\* cited by examiner

UI 1: Please specify one of the restaurants A, B or C that you would like to make a reservation.

Fill in: ☐     106a

UI 2: Do you want to make a reservation at Restaurant C?

○ Yes   ○ No     106b

UI 3: Please specify whether you want to make a reservation for breakfast, lunch or dinner Fill in: ☐     106c

UI 4: Do you want to make a reservation for dinner?

○ Yes   ○ No     106d

104

(Restaurants)

| (Meals) | A | B | C |
|---|---|---|---|
| Breakfast | | | ✓ |
| Lunch | | ✓ | ✓ |
| Dinner | ✓ | ✓ | ✓ |

Form

Slot 1: (A/B/C)

Slot 2: (Breakfast/Lunch/Dinner)

Q-function

| State | 1 = (slot 1, UI 1) | 2 = (slot 1, UI 2) | 3 = (slot 2, UI 3) | 4 = (slot 2, UI 4) |
|---|---|---|---|---|
| 0 | 0 | 0 | 0 | 0 |
| 1 | 0 | x | x | x |
| 2 | x | x | 0 | 0 |
| 3 | x | x | x | 0 |
| 4 | x | x | x | x |
| 5 | x | 0 | 0 | x |
| 6 | 0 | 0 | x | x |
| 7 | x | 0 | x | x |
| 8 | x | x | x | x |
| 9 | x | x | x | x |
| 10 | x | x | x | x |
| 11 | x | x | x | x |
| 12 | x | x | x | x |
| 13 | x | x | x | x |
| 14 | x | x | x | x |
| 15 | x | x | 0 | x |
| 16 | 0 | x | x | x |

Agent Action

Fig. 3

Rewards Function

| State | 1 = (slot 1, UI 1) | 2 = (slot 1, UI 2) | Agent Action<br>3 = (slot 2, UI 3) | 4 = (slot 2, UI 4) |
|---|---|---|---|---|
| 0 | -10 | -2 | -10 | -2 |
| 1 | -10 | x | x | x |
| 2 | x | x | -10 | -2 |
| 3 | x | x | x | -2 |
| 4 | x | x | x | x |
| 5 | x | x | -10 | x |
| 6 | -10 | -2 | x | x |
| 7 | x | -2 | x | x |
| 8 | x | x | x | x |
| 9 | x | x | x | x |
| 10 | x | x | x | x |
| 11 | x | x | x | x |
| 12 | x | x | x | x |
| 13 | x | x | x | x |
| 14 | x | x | x | x |
| 15 | x | x | -10 | x |
| 16 | -10 | x | x | x |

Fig. 4

Episode 1

| Time Index | 0 | 1 | 2 | 3 |
|---|---|---|---|---|
| State | 0 | 2 | 15 | 10 |
| Agent Action | 1 | 4 | 3 | x |
| User Action | Restaurant C | No | Lunch | x |
| Reward | x | -10 | -2 | -10 |
| Return | -22 | -12 | -10 | x |

Q-function

| | Agent Action | | | |
|---|---|---|---|---|
| State | 1 = (slot 1, UI 1) | 2 = (slot 1, UI 2) | 3 = (slot 2, UI 3) | 4 = (slot 2, UI 4) |
| 0 | -22 | 0 | 0 | 0 |
| 1 | 0 | x | x | x |
| 2 | x | x | x | -12 |
| 3 | x | x | 0 | 0 |
| 4 | x | x | x | x |
| 5 | x | 0 | 0 | x |
| 6 | 0 | 0 | x | x |
| 7 | x | x | x | x |
| 8 | x | x | x | x |
| 9 | x | x | x | x |
| 10 | x | x | x | x |
| 11 | x | x | x | x |
| 12 | x | x | x | x |
| 13 | x | x | x | x |
| 14 | x | x | x | x |
| 15 | x | x | -10 | x |
| 16 | 0 | x | x | x |

Fig. 5A

Episode 2

| Time Index | 0 | 1 | 2 |
|---|---|---|---|
| State | 0 | 6 | 9 |
| Agent Action | 4 | 2 | x |
| User Action | Yes | Yes | x |
| Reward | x | -2 | -2 |
| Return | -4 | -2 | x |

Q-function

| State | Agent Action | | | |
|---|---|---|---|---|
| | 1 = (slot 1, UI 1) | 2 = (slot 1, UI 2) | 3 = (slot 2, UI 3) | 4 = (slot 2, UI 4) |
| 0 | -22 | 0 | 0 | -4 |
| 1 | 0 | x | x | x |
| 2 | x | x | x | -12 |
| 3 | x | x | x | 0 |
| 4 | x | x | 0 | x |
| 5 | x | x | 0 | x |
| 6 | 0 | -2 | -2 | x |
| 7 | x | 0 | x | x |
| 8 | x | x | x | x |
| 9 | x | x | x | x |
| 10 | x | x | x | x |
| 11 | x | x | x | x |
| 12 | x | x | x | x |
| 13 | x | x | x | x |
| 14 | x | x | x | x |
| 15 | x | x | -10 | x |
| 16 | 0 | x | x | x |

Fig. 5B

Episode 3

| Time Index | 0 | 1 | 2 |
|---|---|---|---|
| State | 0 | 2 | 9 |
| Agent Action | 1 | 4 | x |
| User Action | Restaurant C | Yes | x |
| Reward | x | -10 | -2 |
| Return | -12 | -2 | x |

Q-function

| State | Agent Action | | | |
|---|---|---|---|---|
| | 1 = (slot 1, UI 1) | 2 = (slot 1, UI 2) | 3 = (slot 2, UI 3) | 4 = (slot 2, UI 4) |
| 0 | -22 | 0 | 0 | -4 |
| 1 | 0 | x | x | x |
| 2 | x | x | 0 | -7 |
| 3 | x | x | x | 0 |
| 4 | x | x | 0 | x |
| 5 | x | x | 0 | x |
| 6 | 0 | -2 | x | x |
| 7 | x | 0 | x | x |
| 8 | x | x | x | x |
| 9 | x | x | x | x |
| 10 | x | x | x | x |
| 11 | x | x | x | x |
| 12 | x | x | x | x |
| 13 | x | x | x | x |
| 14 | x | x | x | x |
| 15 | x | x | -10 | x |
| 16 | 0 | x | x | x |

Fig. 5C

Form

Slot 1 : (A/B/C)

802

UI 1 : Please specify one of the restaurants A, B or C that you would like to make a reservation.

Prompt: _____

804a

UI 2 : Do you want to make a reservation at Restaurant C?

Prompt: _____

Q-function

| State | Agent Action | |
|---|---|---|
| | 1 = (slot 1, UI 1) | 2 = (slot 1, UI 2) |
| 0 | 0 | 0 |
| 1 | x | x |
| 2 | x | x |
| 3 | x | x |

Fig. 10

Rewards Function

| State | Agent Action | |
|---|---|---|
| | 1 = (slot 1, UI 1) | 2 = (slot 1, UI 2) |
| 0 | -10 | -5, -10, -15 |
| 1 | x | x |
| 2 | x | x |
| 3 | x | x |

Fig. 11

Episode 1

| Time Index | 0 | 1 |
|---|---|---|
| State | 0 | 2 |
| Agent Action | 1 | x |
| Drawn Slot Value | Restaurant B | x |
| Inferred/Drawn User Action | "Rest B" in UI 1 | x |
| Reward | x | -10 |
| Return | -10 | x |

Q-function

| | Agent Action | |
|---|---|---|
| State | 1 = (slot 1, UI 1) | 2 = (slot 1, UI 2) |
| 0 | -10 | 0 |
| 1 | x | x |
| 2 | x | x |
| 3 | x | x |

Fig. 12A

Episode 2

| Time Index | 0 | 1 |
|---|---|---|
| State | 0 | 2 |
| Agent Action | 2 | x |
| Drawn Slot Value | Restaurant B | x |
| Inferred/Drawn User Action | "No" in UI 2 | x |
| Reward | "Rest B" in UI 1 | x |
| Return | -15 | -15 |

Q-function

| | Agent Action | |
|---|---|---|
| State | 1 = (slot 1, UI 1) | 2 = (slot 1, UI 2) |
| 0 | -10 | -15 |
| 1 | x | x |
| 2 | x | x |
| 3 | x | x |

Fig. 12B

METHOD AND SYSTEM FOR CONFIGURING FORM FILLING APPLICATION TO MINIMIZE FORM FILLING EFFORT

FIELD OF THE INVENTION

The present invention relates to a method for configuring a form filling application in order to minimize the form filling effort, and more specifically relates to a configuration process that follows concepts from reinforcement learning.

BACKGROUND

Data entry and data collection is a central task for many processes at the interface between a user and a computer system. Often times, such data entry is performed in association with a set of fields (e.g., structured as name-value pairs), and the task that is required is to input the correct value(s) in the appropriate field(s). The set of structured fields may be known as a form, and the process to input values into the appropriate fields may be known as form filling. Discussed herein are various techniques for configuring a software application so as to minimize the effort of the user when using the software application to fill fields or slots of a form.

SUMMARY OF THE INVENTION

In accordance with one embodiment of the invention, a form filling application is configured to minimize the form filling effort of a user. The configuration follows concepts from reinforcement learning, and includes optimizing a policy for selecting agent actions in a manner that maximizes a reward signal. In the context of the form filling application, an agent action may specify one or more slots of the form for the user to fill, and further specify one or more user interfaces for filling the specified one or more slots. The reward signal may be defined as an inverse function of the user effort, so that maximizing the reward signal has the desired effect of minimizing the user effort.

The policy may be expressed in terms of a q-function that maps state—agent action pairs to values, in which each of the values may specify an average return for a corresponding state—agent action pair. Therefore, optimizing the policy may involve determining the optimal q-function. If not already apparent, a return may be computed as a sum of future rewards, and in some embodiments, may be computed as a sum of time-discounted future rewards.

The policy may be optimized by simulating episodes (i.e., traversals through a state model of a process to fill out a form). Simulating an episode may include simulating an agent action based on an e-greedy policy (i.e., following an exploration policy with probability c, and following an exploitation/greedy policy with probability 1–ε). In one embodiment of the invention, simulation of the agent action is followed by the simulation of a slot value for the slot specified by the simulated agent action. The simulation of the episode then backtracks in time, and simulates the user action (or a series of user actions) that, when performed on the user interface specified by the simulated agent action, results in the simulated slot value. A reward is then simulated based on the user effort of the simulated user action, and a next state is determined based on the drawn slot value. This process may be repeated until the process reaches a terminal state, and the simulation of the episode concludes. Returns are then computed based on the rewards simulated for the episode and the q-function is updated based on the computed returns. Many other episodes may be simulated in a similar fashion, until the q-function sufficiently converges to the optimal q-function.

In another embodiment of the invention, simulation of the agent action is immediately followed by the simulation of a user action that is performed on the user interface specified by the simulated agent action. A next state is determined based on the agent action and the simulated user action. In such an embodiment, there is no direct simulation of the slot value for the slot specified by the simulated agent action. In some instances, the simulated user action will specify a slot value, while in other instances the simulated user action may not uniquely specify a slot value, but instead could narrow down the possible slot values for the slot.

After the q-function has sufficiently converged, the form filling application may be used by a "real" user to fill a form (i.e., a real user rather than a simulated user). An agent of the form filling application may determine an agent action based on a greedy policy (i.e., computing the argmax of the q-function for a particular state). The agent action may specify one or more slots of the form for the user to fill out, and further specify one or more user interfaces for filling the specified one or more slots. The user may respond to the one or more user interfaces. If the user response uniquely specifies one or more slot values, those slot values may be recorded in the one or more slots specified by the agent action. The next state may be determined based on the agent action and the user action (i.e., the user's response to the one or more user interfaces). This process can be repeated until all slots of the form are filled. During such process with a real user interacting with the form filling application to fill a form, the "real" episode, which includes actions from the real user, may be used in addition to the simulated episodes to optimize the policy.

While much of the description herein will refer to filing slots of a form, it is understood that concepts described herein can be applied to many data collection processes. Therefore, while it is possible that a physical form may be associated with the "form" described herein, it is also possible that the "form" refers to other constructs; for example, a software program with variables configured to store values provided by a user, in which the variables would be analogous to the slots described herein.

These and other embodiments of the invention are more fully described in association with the drawings below.

BRIEF DESCRIPTION OF THE DRAWINGS

FIG. 1 depicts an example form and various user interfaces for filling one or more slots of the form, in accordance with one embodiment of the invention.

FIG. 3 depicts an initialization of a q-function corresponding to the state model of FIG. 2, in accordance with one embodiment of the invention.

FIG. 4 depicts a rewards function corresponding to the state model of FIG. 2, in accordance with one embodiment of the invention.

FIG. 5A depicts a first simulated episode of filling out the form depicted in FIG. 1, and the q-function updated based on the first simulated episode, in accordance with one embodiment of the invention.

FIG. 5B depicts a second simulated episode of filling out the form depicted in FIG. 1, and the q-function updated based on the second simulated episode, in accordance with one embodiment of the invention.

FIG. 5C depicts a third simulated episode of filling out the form depicted in FIG. 1, and the q-function updated based on the third simulated episode, in accordance with one embodiment of the invention.

FIG. 8 depicts an example form with a single slot and two user interfaces for filling the slot, in accordance with one embodiment of the invention.

FIG. 10 depicts an initialization of a q-function corresponding to the state model of FIG. 9, in accordance with one embodiment of the invention.

FIG. 11 depicts a rewards function corresponding to the state model of FIG. 9, in accordance with one embodiment of the invention.

FIG. 12A depicts a first simulated episode of filling out the form depicted in FIG. 1, and the q-function updated based on the first simulated episode, in accordance with one embodiment of the invention.

FIG. 12B depicts a second simulated episode of filling out the form depicted in FIG. 1, and the q-function updated based on the second simulated episode, in accordance with one embodiment of the invention.

DETAILED DESCRIPTION OF THE INVENTION

Figure 2:
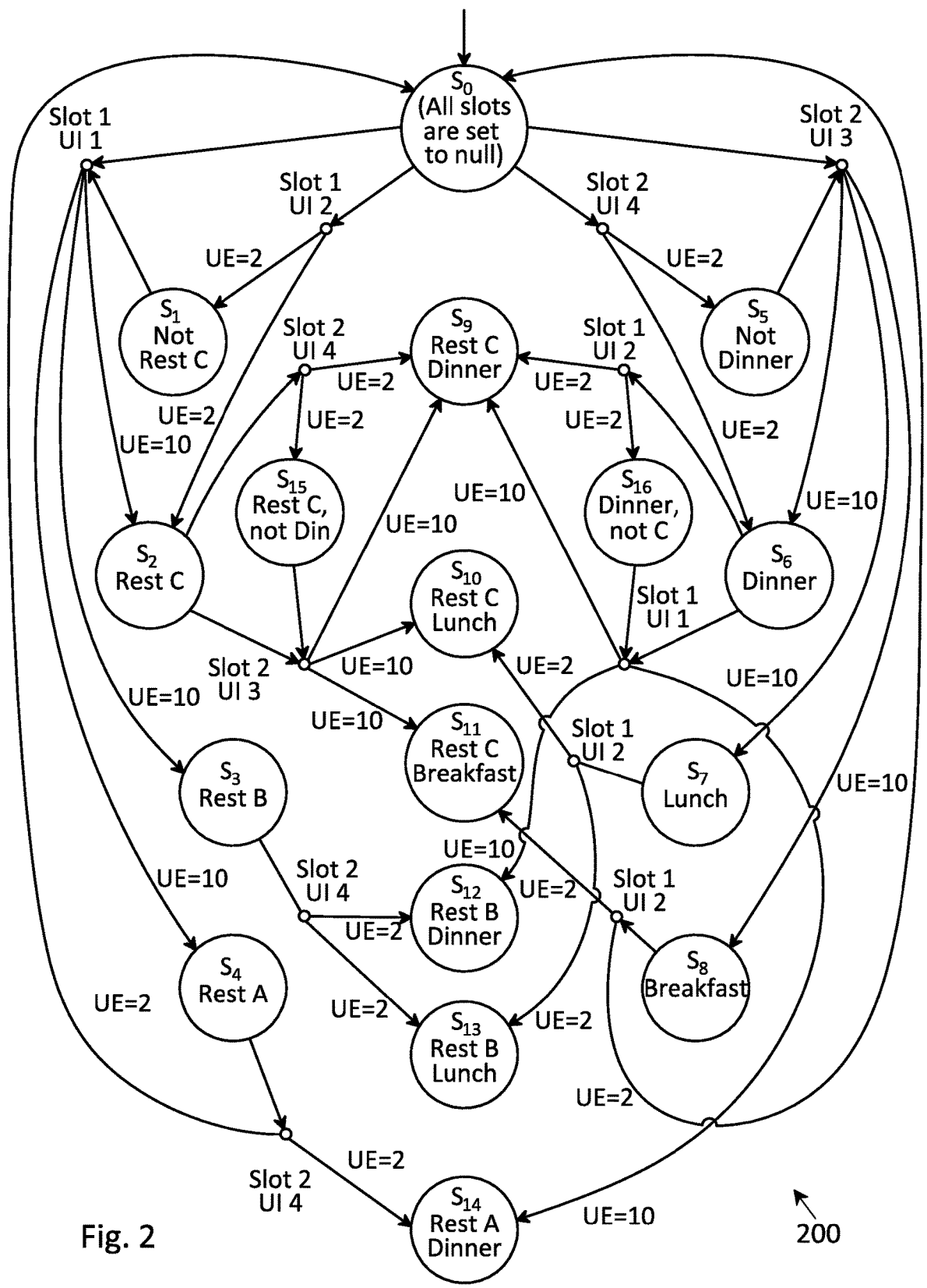
FIG. 2 depicts a state model of a process to fill the slots of the form depicted in FIG. 1, in accordance with one embodiment of the invention.

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. Descriptions associated with any one of the figures may be applied to different figures containing like or similar components/steps.

An objective of the invention is to minimize user effort in filling out forms by dynamically selecting user interfaces, configured to solicit information applicable to the form, to present to the user. The inputs to the form filling application may include information to be collected from the user via the form filling application (e.g., the values to be entered in empty slots of the form), the information already collected from the user by the form filling application (e.g., provided or inferred slot values), the information already known or inferred about the user, and historical form filling data and form filling behavior of other users.

Considerations in selecting a user interface or one or more portions (e.g., screens) thereof may include whether to include more open-ended questions or directed questions in the user interface. Examples of more open-ended questions include: "What software do you want?", "What date do you want your laptop delivered?" or "Which mailing list do you want to join?" Examples of more directed questions include: "Is XYZ the software you want?" or "You want your package delivered tomorrow, right?" Other considerations in selecting a user interface or portions thereof may include whether to present a web-based form for the user to fill out, a chat-based interface in which the user can specify what he/she wants in a natural language style (with information for entry to the form field(s) later being extracted or adapted from the user's input), or an enhanced chat-based interface (e.g., a chat client with a user interface similar to a web interface embedded within the chat client).

Forms may be represented by a set of slots and each slot may include an associated slot name and a slot value. With a model built on information already collected and information already known about the user, at any given point in time, for each slot, a prediction can be made for the value of each slot based on a probability distribution. In certain instances, the prediction can be known to be accurate with 100% certainty, for example if the user directly supplies the information, or if a slot value can be populated with information that is known about the user (e.g., a stored credit card number, a date of birth, an address, etc.). In other instances, the user profile, user preferences and historical data of how the slots are filled may be used to predict the slot values. In other words, the probability distribution P (slot value|slot name, slot type, user profile, user preference, historical data) may be used to predict a slot value.

Different user interfaces ("UIs") may cause a different cognitive load on users and therefore be associated with different levels of user effort. For example, confirmative Yes/No questions may be easier to answer and be associated with a low level of user effort. Some questions can be more easily answered via one UI type than another. For example, a question with a large number of possible answer choices may be more easily handled by a user via a dropdown menu with the most likely answer choice preselected or listed first in the menu. On the other hand, a question with a limited number of possible answer choices may be more easily handled by a user via a short choice question (e.g., please select one of answers A, B or C) and a radio button selector. Other considerations may influence whether it is more optimal to present a conversational UI or a text input box. For example, a text field that requires frequent modification may be difficult for a user to complete using a conversational UI, but may be easier for the user to complete using a text input box.

With the recent advancement in machine-based natural language understanding capabilities, it is becoming easier for users to fill slots with natural language-style inputs. For example, user inputs such as "in two days" or "next Tuesday" can be converted by a system with natural language understanding (NLU) to an actual date. As a specific example of implementing a user interface to handle natural language-style inputs, a named-entity recognition (NER) system may be trained to understand various ways in which people refer to certain entities inside a company (e.g., the first name of "Michael" may be understood to refer to a specific "Michael" at the company based on the context of the messaging with the NER system, or "$2^{nd}$ floor" may be translated into an exact location based on where the user works). In some instances, it may be more convenient for a user to input a complete sentence and then have a natural language engine fill multiple slots of a form by extracting information from the complete sentence.

The above-discussion reveals that there are many considerations that may come into play when designing a form filling application. While these considerations could be encapsulated into heuristics for designing a form filling application, the remainder of the discussion approaches this problem using the framework of reinforcement learning, in which a form filling application can be configured to not only optimally select which user interfaces to present, but also determine the optimal order in which to present those interfaces, with both considerations jointly optimized so as to minimize the user effort in completing the form. That is, in the remainder of the discussion, the focus is not on how to design a particular UI window or prompt, but rather given a collection of UIs (each with its associated advantages and disadvantages), how to optimally select the UIs to present and in which order.

FIG. 1 depicts simplified form 102 with two slots as an example within which concepts of the invention may be discussed and better appreciated. Form 102 may be used in the context of making a restaurant reservation. In the simplified example, there are three restaurant options, A, B and C. As shown in table 104, restaurant A only serves dinner, restaurant B serves lunch and dinner, but not breakfast, while restaurant C serves breakfast, lunch and dinner. The first slot of form 102 accepts a choice of restaurant (in other words, the possible slot values for slot 1 are A, B and C) and the second slot accepts a choice of meal (in other words, the possible slot values for slot 2 are breakfast, lunch and dinner). For simplicity, each slot is configured to accept only one slot value. For instance, a user may specify a reservation at restaurant A, but not both restaurants A and B. It is understood that, in general, a form could have one or more slots, and a form could be used to collect information in a variety of contexts, for example, for technical support, to book an airplane ticket, to sign-up for internet service, etc.

FIG. 1 also depicts various user interfaces 106a, 106b, 106c, and 106d that may be presented by the form filling application for a user to use to fill one or more slots of form 102. User interface 106a may include the prompt "Please specify one of Restaurants A, B or C that you would like to make a reservation", and a text box for the user to input his/her selection. User interface 106b may include the prompt "Do you want to make a reservation at Restaurant C?" and radio buttons with the choices of Yes and No. User interface 106c may include the prompt "Please specify whether you want to make a reservation for breakfast, lunch or dinner", and a text box for the user to input his/her selection. User interface 106d may include the prompt "Do you want to make a reservation for dinner?" and radio buttons with the choices of Yes and No.

In the example of FIG. 1, user interface 106a (also called "UI 1") and user interface 106b (also called "UI 2") are configured to collect information regarding slot 1, whereas user interface 106c (also called "UI 3") and user interface 106d (also called "UI 4") are configured to collect information regarding slot 2. In some instances, the information that is collected by one or more of the UIs 106a-106d may be a slot value, while in other instances, the information that is collected may permit the elimination of one or more slot values.

An important metric associated with the user interfaces and the form filling process is the "user effort", which may refer to the amount of effort taken by a user to understand the information presented in the user interface and then specify a slot value or input an answer in the user interface. For clarity, it is noted that there may not be a one-to-one correspondence between the actions of "specifying a slot value" and "specifying an answer". For instance, specifying the answer choice of "No" in user interface 106b may not completely specify the slot value for slot 1, as it merely indicates that the slot value is not C. The time taken by a user to specify a slot value and/or an answer (also called latency) may be a useful proxy for measuring the user effort. Generally, a longer time spent by the user to provide an answer when presented with a UI seeking an input indicates greater user effort, whereas a shorter time spent by the user indicates less user effort (of course, factors other than user effort may influence the time required to respond to a prompt or call to action associated with a user interface, nevertheless, that time is one useful consideration). In addition to time, other useful metrics for evaluating the user effort associated with a user interface include the number of keystrokes required to complete an answer to an interrogatory posed by the UI, the number of mouse clicks required to provide an answer or conform to a direction specified by the UI, the number of scrolling motions required to review instructions, provide an answer, and/or conform to a direction specified by the UI, etc. As will be discussed in more detail below, user effort may be used as an optimization criterion in the selection of the optimal set of user interfaces and the determination of the order in which to present the user interfaces (i.e., with the goal of minimizing the user effort).

As discussed above, there may be numerous tradeoffs associated with each user interface. Such tradeoffs are further described below to help develop the reader's intuition of the tradeoffs, but ultimately, an automated process (i.e., an agent) will be tasked with making the proper tradeoffs. In the example of FIG. 1, the tradeoffs between "long form" and "short form" interfaces is discussed. User interfaces 106a and 106c may be known as "long form" interfaces, in which all answer choices are presented. Such an interface may require more user time to read through all the answer choices as well as to make a selection of one of the answer choices, but has the advantage of the user's answer choice, in most cases, completely specifying the slot value. In the simplified example of user interface 106a, the increased user effort may not be readily apparent, as there are only three answer choices and each of the answer choices may be input rather easily. However, an increased user effort will be more apparent in the scenario in which, for example, ten answer choices are presented, and/or if the answer choices were longer text strings, such as "Anne's Bistro", "Buffalo Bill's Bar" and "Cathy's Cafe", in which it may take more time for a user to specify an answer choice.

In contrast, user interfaces 106b and 106d may be known as "short form" interfaces, in which the interface may present and/or may be configured to accept fewer than all the possible slot values. If the slot value(s) presented and/or accepted by the short form interface are aligned with the desired slot value of the user, the short form interface may be completed in a shorter amount of time, on average, than the long form interface. However, if the slot value(s) provided by the short form interface are not aligned with the desired slot value of the user, the short form interface may actually not provide any time savings to the user. In the example of user interface 106d, if the user desired to specify the answer choice of "dinner", "short form" interface 106d would likely take less time for the user to specify the slot value of "dinner" (in which the user only reads the slot value of dinner and selects the "yes" radio button) than "long form" interface 106c (in which the user would need to read through all three possible slot values and then type in the answer choice of "dinner"). However, if the user were presented with user interface 106*d*, but the user desired to specify the slot value of "lunch", the short form interface may not provide any time savings to the user. In one scenario (as considered in the state model of FIG. 2), the failure in the short form interface to correctly "guess" the desired slot value of the user causes the subsequent presentation of the long form interface, which almost certainly would require more user effort than just presenting the long form interface in the first place.

The example presented in FIG. 1 illustrates that there may be some complexity in choosing which of user interfaces 106*a*, 106*b*, 106*c*, and 106*d* to present to a user in order to minimize user effort, as the choice could depend on many factors. For instance, if it is known that restaurant C is a very popular restaurant, then, on average, the user effort could be minimized by presenting "short form" interface 106*b*. On the other hand, if restaurant C were closed due to remodeling, it could be more advantageous to present long form interface 106*a*.

While not clearly illustrated in the example of FIG. 1, it is noted that the order in which slots are filled (i.e., slot order) may also have an effect on the overall user effort (in which the "overall user effort" refers to the user effort to fill out an entire form). In general, it is more advantageous to present the slots with the most "information gain" first (in which information gain is used in the context of information theory). For instance, imagine another form (not depicted) in the medical field with two slots, one that accept a person's gender and the other slot accepting whether a person is pregnant or not. In this example, the optimal order in which to fill the slots would be to fill the gender slot first, followed by the slot regarding pregnancy status. The reason is that (assuming the form were presented to a population with 49% male, 49% female, and 2% non-binary gender patients), 49% of the time, the answer provided in response to the gender question would allow the system to automatically infer the pregnancy status (assuming that all individuals who identify as male cannot be pregnant), and in those instances, there would be no need for the user to even provide the pregnancy status. On the other hand, if the pregnancy status question were queried first, no definitive inference as to the patient's gender may be possible (i.e., even if a patient were pregnant, it would be unknown whether that patient identifies as female or as a non-binary gender). Therefore, if the pregnancy status question were completed first, in all instances, the patient would likely need to subsequently provide his/her/their gender, which would require a higher overall user effort.

In one embodiment of the invention, the slot order and the selection of a user interface (for a user to fill one or more slots of a form) may be jointly optimized by the software application to minimize the overall user effort. Such optimization problem may be addressed using the framework of reinforcement learning. Reinforcement learning is well known in the art, and, for conciseness, the basic concepts of reinforcement learning will not be discussed herein. For an in-depth discussion of the concepts from reinforcement learning, see Sutton, R. S., Barto, A. G., Reinforcement Learning: An Introduction. MIT Press, 1998. The remainder of the discussion will utilize terms such as "agent", "action", episode, "reward", "reward function", "return", "policy", "q-function", etc, in a manner that is consistent with how those terms are used in reinforcement learning. In some instances, the definitions for these terms is drawn explicitly from Sutton et al.

In some applications of reinforcement learning, a training phase is carried out during which a policy is updated/optimized, followed by an application phase in which the optimized policy is applied. In other applications of reinforcement learning, the policy may be continually updated/optimized, and there may be no clear boundary between the training and application phases. The description below will generally follow the former flow of reinforcement learning, although it is understood that the concepts described herein can be readily applied to the latter flow.

During the "training phase", an agent may select an action based on a policy and a current state. The "agent" (i.e., the learner and decision maker) typically refers to a computer-implemented process (e.g., a process of a software application), and not a "human agent" in the reinforcement learning context. For clarity of discussion (and in a slight deviation from terminology typically used in reinforcement learning), the "action" of an agent will be explicitly called the "agent action", rather than just "action" as is conventionally used in literature. The agent action is performed on the environment (i.e., everything outside of the agent). In the scenario of interest, a user will also be part of the environment (although in the general reinforcement learning context, the environment may or may not include a user), and in response to the agent action, the user will also perform an action, called the "user action". The user may refer to an actual user or a simulated user. In the preferred embodiment, a simulated user will be used to perform the user action during the training phase, in order to minimize the inconvenience on actual users. Following the user action, a numerical reward (i.e., a numerical value that the agent seeks to maximize over time through its choices of actions) as well as the next state are determined through observations of the environment. This process is repeated numerous times during the training phase (e.g., with a subsequent agent action, a subsequent user action, etc.). At some point in the presently described process, the policy (more specifically the "greedy" policy, as will be discussed below) will be updated based on the determined rewards, or more precisely, on the return determined for the current state (the return typically being a function of the future rewards). The determination of a return will be more clearly understood in the context of the examples presented in FIGS. 5A-C and 12A-B below.

In a Monte Carlo approach, the policy update is performed at the end of an episode (i.e., after the process has reached a terminal state) based on the rewards observed during that episode. The current policy is updated many times in this manner (via the repeated simulation of episodes) until the current policy sufficiently converges to the optimal policy. Of course, the optimal policy is not known in practice, so whether the current policy has sufficiently converged to the optimal policy is not determined based on an error signal between the current policy and the optimal policy, but instead may be determined based on, for example, the stability of the q-function (e.g., mean-squared error of two successive q-functions being less than a threshold). In a temporal difference (TD) approach, the policy update is performed after a single time step based on an estimate of the return for the current state (rather than an actual computation of the return for the current state based on future rewards). The policy is updated many times in this manner until the policy sufficiently converges to the optimal policy. Because episodes tend to be shorter in the form filing embodiments of interest, the Monte Carlo approach is the preferred approach, and will be the approach that will be described in the examples below.

There are several policies that the agent may follow. In a first policy (commonly known as an exploration policy), the agent may randomly select an action that can be performed from the current state. The "exploration" policy tends to promote an exploration of the state space of the state model. In a second policy (commonly known as a greedy or "exploitation" policy), the agent picks an action that maximizes the immediate reward. In other words, given the information currently known by the agent, the agent picks the action that has been observed to result in the maximum return (on average). In a hybrid of the two policies (commonly known as an c-greedy policy), with a probability of c, the agent follows the exploration policy, and with a probability of 1-c, the agent follows the greedy policy. The c-greedy policy is typically followed during the training phase, as it has been mathematically proven that such a policy will converge to the optimal policy. In one embodiment, c is chosen to be a number between 0.5 and 1 so that exploration is performed more frequently than exploitation.

After the policy has sufficiently converged to the optimal policy in the training phase, the process may transition to a "model application" phase, in which the greedy policy is always followed and a real user is substituted for the simulated user (if a simulated user were being used). In the model application phase, the policy may no longer be updated, so rewards may no longer be observed. However, in a context in which the environment and/or the behavior of the user is expected to evolve over time (i.e., is non-stationary), policy updates may continue to occur, which would require the continual monitoring of rewards.

FIG. 2 depicts state model 200 of a process to fill the slots of form 102 depicted in FIG. 1. This model may be used during the training phase as well as the model application phase. State model 200 may be manually or automatically generated based on form 102 and the collection of possible user interfaces (106a, 106b, 106c, and 106d). A manually generated state model may include a reduced number of states, and result in a faster convergence to the optimal policy. On the other hand, an automatically generated state model may be preferred, even if the state space is larger and causes a slower convergence to the optimal policy, since the entire process to decide upon the slot order and user interfaces to present can be performed in an automated manner.

State model 200 may include a collection of states, and edges that are taken to transition from one state to another state. In the example of state model 200, there are a total of 17 states, labeled $S_0$-$S_{16}$, in which each state (other than the initial state) summarizes information specified by the user actions. $S_0$ indicates the initial state in which all slots are set to null. $S_1$ indicates the user's selection up to the present moment of "not Restaurant C"; $S_2$ indicates the user's selection up to the present moment of "Restaurant C"; $S_3$ indicates the user's selection up to the present moment of "Restaurant B"; $S_4$ indicates the user's selection up to the present moment of "Restaurant A"; $S_5$ indicates the user's selection up to the present moment of "not Dinner"; $S_6$ indicates the user's selection up to the present moment of "Dinner"; $S_7$ indicates the user's selection up to the present moment of "Lunch"; $S_8$ indicates the user's selection up to the present moment of "Breakfast"; $S_9$ indicates the user's selections up to the present moment of "Dinner at Restaurant C"; $S_{10}$ indicates the user's selections up to the present moment of "Lunch at Restaurant C"; $S_{11}$ indicates the user's selections up to the present moment of "Breakfast at Restaurant C"; $S_{12}$ indicates the user's selections up to the present moment of "Dinner at Restaurant B"; $S_{13}$ indicates the user's selections up to the present moment of "Lunch at Restaurant B"; $S_{14}$ indicates the user's selections up to the present moment of "Dinner at Restaurant A"; $S_{15}$ indicates the user's selections up to the present moment of "Restaurant C, but not dinner"; and 516 indicates the user's selections up to the present moment of "Dinner, but not Restaurant C".

More generally, each state of the state model includes information that is accessible to the agent. For example, a state may include information regarding a client device of the user (e.g., Android OS, iOS) or other information that is stored as part of a user profile, information regarding a preferred interface type (e.g., chat interface, web interface) or other information that is stored as part of the user's preferences, previous answer choices of the user (or other users), or other information that may be stored as part of historical data.

Each edge of state model 200 includes the sequence of one agent action followed by one user action. In one embodiment of the invention, an agent action specifies one or more slots for the user to fill and specifies one or more user interfaces for the user to use to fill the one or more slots selected by the agent action. In the simplified example of FIG. 2, an agent action is the pairing of one slot with one user interface. Since there are two slots and four user interfaces, one may initially think that there are 8 possible agent actions. However, since the user interfaces 106a, 106b, 106c, and 106d are only configured to collect information for one specific slot (i.e., slot 1 or slot 2), only four agent actions are possible. In the following discussion, action 1 will be defined as the pairing of (slot 1, UI 1); action 2 will be defined as the pairing of (slot 1, UI 2), action 3 will be defined as the pairing of (slot 2, UI 3); and action 4 will be defined as the pairing of (slot 2, UI 4).

From the initial state, $S_0$, all four agent actions are possible. If the agent performs action 1 (slot 1, UI 1) from the initial state, $S_0$, three user actions are possible. The user action of specifying "Restaurant C" leads to state $S_2$ (Restaurant C); the user action of specifying "Restaurant B" leads to state $S_3$ (Restaurant B); and the user action of specifying "Restaurant A" leads to state $S_4$ (Restaurant A). To not unnecessarily clutter state model 200, the user actions are not explicitly labeled in FIG. 2, since one should be able to infer based on the resulting state which user action was taken. For instance, in state $S_2$ (Restaurant C), it should be readily apparent that the user specified "Restaurant C" in user interface 106a in order for the process to transition from action 1 to state $S_2$.

If the agent performs action 2 (slot 1, UI 2) from the initial state, $S_0$, two user actions are possible. The user action of answering "No" leads to state $S_1$ (not Restaurant C), whereas the user action of answering "Yes" leads to state $S_2$ (Restaurant C).

If the agent performs action 3 (slot 2, UI 3) from the initial state, $S_0$, three user actions are possible. The user action of specifying "Dinner" leads to state $S_6$ (Dinner); the user action of specifying "Lunch" leads to state $S_7$ (Lunch); and the user action of specifying "Breakfast" leads to state $S_8$ (Breakfast).

If the agent performs action 4 (slot 2, UI 4) from the initial state, $S_0$, two user actions are possible. The user action of answering "No" leads to state $S_5$ (not Dinner), whereas the user action of answering "Yes" leads to state $S_6$ (Dinner).

From state $S_1$ (not Restaurant C), only agent action 1 is considered for simplicity. In other words, if short form interface 106b fails to arrive at a slot value, the long form interface 106a is subsequently presented, and by design, there is no possibility for short form interface 106b to be repeatedly presented. It is noted that in a less optimal construction of state 200 (e.g., in an automated construction of state model 200), agent action 2 could also be included from state $S_1$, but in the long run, the agent will learn to never take agent action 2 from state $S_1$, as such an action would only increase the user effort.

From state $S_2$ (Restaurant C), two agent actions are possible (i.e., either present UI 3 or UI 4). If UI 3 is presented from state $S_2$, three user actions are possible. "Dinner" leads to state $S_9$ (Dinner at Restaurant C); "Lunch" leads to state $S_{10}$ (Lunch at Restaurant C); and "Breakfast" leads to state $S_{11}$ (Breakfast at Restaurant C). If UI 4 is presented from state $S_2$, two user actions are possible. "No" leads to state $S_{15}$ (Restaurant C, but not dinner), whereas "Yes" leads to state $S_9$ (Dinner at Restaurant C).

From state $S_3$ (Restaurant B), only agent action 4 is considered for simplicity (i.e., agent action 3 from state $S_3$ could be considered in a more complete implementation). In response to UI 4, two user actions are possible. "Yes" leads to state $S_{12}$ (Dinner at Restaurant B) and "No" leads to state $S_{13}$ (Lunch at Restaurant B), in which, for simplicity, lunch is inferred as the user's choice of meal (since lunch is the only remaining meal option at Restaurant B if dinner is rejected by the user). However, in a more complete implementation, short form interface 106d could be followed by long form interface 106c if the user rejects the choice of dinner, and further, if the user makes a selection of breakfast in long form interface 106c, the process could return to the initial state, $S_0$, since Restaurant B does not serve breakfast.

From state $S_4$ (Restaurant A), only agent action 4 is considered for simplicity (i.e., agent action 3 from state $S_4$, could be considered in a more complete implementation). In response to UI 4, two user actions are possible. "Yes" leads to state $S_{14}$ (Dinner at Restaurant A) and "No" leads to state $S_0$ (initial state), since Restaurant A only serves dinner, and accordingly, the user must choose another restaurant if he/she wants to have breakfast or lunch.

From state $S_5$ (not Dinner), only agent action 3 is considered for simplicity. In other words, if short form interface 106d fails to arrive at a slot value, the long form interface 106c is subsequently presented, and by design, there is no possibility for short form interface 106d to be repeatedly presented.

From state $S_6$ (Dinner), two agent actions are possible (i.e., either present UI 1 or UI 2). If UI 2 is presented from state $S_6$, two user actions are possible. "Yes" leads to state $S_9$ (Dinner at Restaurant C), whereas "No" leads to state $S_{16}$ (Dinner, but not at Restaurant C). If UI 1 is presented from state $S_6$, three user actions are possible. "Restaurant A" leads to state $S_{14}$ (Dinner at Restaurant A); "Restaurant B" leads to state $S_{12}$ (Dinner at Restaurant B); and "Restaurant C" leads to state $S_9$ (Dinner at Restaurant C).

From state $S_7$ (Lunch), only agent action 2 is considered for simplicity (i.e., agent action 1 from state $S_7$ could be considered in a more complete implementation). In response to UI 2, two user actions are possible. "Yes" leads to state $S_{10}$ (Lunch at Restaurant C) and "No" leads to state $S_{13}$ (Lunch at Restaurant B), in which, for simplicity, Restaurant B is inferred as the user's choice of restaurant (since Restaurant B is the only remaining choice of restaurant that serves lunch if Restaurant C is rejected by the user). However, in a more complete implementation, short form interface 106b could be followed by long form interface 106a if the user rejects the choice of Restaurant C, and further, if the user makes a selection of Restaurant A in long form interface 106a, the process could return to the initial state, $S_0$, since Restaurant A does not serve lunch.

From state $S_8$ (Breakfast), only agent action 2 is considered for simplicity (i.e., agent action 1 from state $S_8$ could be considered in a more complete implementation). In response to UI 2, two user actions are possible. "Yes" leads to state $S_{11}$ (Breakfast at Restaurant C) and "No" leads to state $S_0$ (initial state) since breakfast is only offered by Restaurant C, and accordingly, the user must choose another meal if he/she want to eat at Restaurant A or B.

From state $S_{15}$ (Restaurant C, but not dinner), only agent action 3 is considered for simplicity. In other words, if short form interface 106d fails to arrive at a slot value, the long form interface 106c is subsequently presented, and by design, there is no possibility for short form interface 106d to be repeatedly presented.

From state, $S_{16}$ (Dinner, but not at Restaurant C), only agent action 1 is considered for simplicity. In other words, if short form interface 106b fails to arrive at a slot value, the long form interface 106a is subsequently presented, and by design, there is no possibility for short form interface 106b to be repeatedly presented.

States $S_9$ (Dinner at Restaurant C), $S_{10}$ (Lunch at Restaurant C), $S_{11}$ (Breakfast at Restaurant C), $S_{12}$ (Dinner at Restaurant B), $S_{13}$ (Lunch at Restaurant B) and $S_{14}$ (Dinner at Restaurant A) do not have any outgoing edges and are known as "terminal states". A traversal from the initial state, $S_0$, to any of the terminal states is known as an episode.

The user effort (abbreviated "UE") is labeled next to each edge connecting the agent action to the resulting state and represents the amount of effort associated with performing the user action associated with that edge. A higher value for the user effort indicates more user effort, whereas a lower value indicates less user effort. For simplicity in the example of FIG. 2, the values for the user effort are deterministic values (i.e., user effort equal to "2" for specifying an answer via any of the short form interfaces 106b and 106d and user effort equal to "10" for specifying an answer via any of the long form interfaces 106a and 106c). More generally, the value of user effort may be drawn from a conditional probability distribution, in which the conditional probability distribution is defined as the probability of a value of user effort conditioned upon the slot (e.g., the slot identifier) and user interface selected by the agent action. While state model 200 has a finite state space (i.e., a finite number of states), the concepts described herein can be extended to a state model with an infinite state space by applying concepts from function approximation.

FIG. 3 depicts an initialization of a q-function corresponding to the state model of FIG. 2. The q-function is a mapping from a state-agent action pair to an average return. The first row of the table depicted in FIG. 3 lists all possible agent actions of state model 200 (i.e., actions 1-4), and the first column of the table depicted in FIG. 3 lists all states of the state model (i.e., $S_0$-$S_{16}$). Therefore, FIG. 3 shows a tabular representation of the q-function, in which each of the numerical values of the q-function has been initialized to 0. The entries with an "x" correspond to a state-agent action pair that does not exist. For example, from state $S_1$, agent agents 2, 3, and 4 are not possible, and thus a "x" is marked in these positions to exclude these state-agent action pairs. If not already apparent, the construction of this particular q-function required prior knowledge of the state model, since the state model determined the number of rows of the table (i.e., equal to the total number of states), as well as which state-agent action pairs to include or exclude (i.e., which positions to initialize to 0 or mark with an "x").

As will be more apparent from the discussion below, the greedy policy of selecting the agent action that maximizes the immediate return for a given state may be specified in terms of the q-function (i.e., may be specified as argmax_(agent-action) q-function (state, agent action)). Therefore, the policy updates to make the policy converge to the optimal policy will involve updating the q-function until the q-function sufficiently converges to the "true" q-function, q*. The updating of the q-function will be illustrated in the examples of FIGS. 5A-C and 12A-B below. As will also be more apparent from the discussion below, selection of the initial values for the q-function that are larger than the "true" average returns will result in more initial exploration of the state space. In the present example, as the "true" average returns will all be negative values (due to the use of negative reward values), initializing the q-function to 0 has the effect of encouraging an initial exploration of the state space.

FIG. 4 depicts a rewards function corresponding to the state model of FIG. 2.

The rewards function is constructed based on the metric of user effort described above. Typically, in reinforcement learning, the goal is to maximize the average return (which conceptually translates into maximizing the future rewards). On the other hand, in the above-described goal of selecting the optimal set of user interfaces and the order in which to present to a user to fill a form, the objective was to minimize the user effort. Therefore, to fit the form filling problem to the reinforcement learning framework, an inverse relationship is needed between the reward and the user effort. In FIG. 4, the inverse relationship of reward=(−1)*(user effort) is used, although other inverse relationships (e.g., i/x, for x>0) are also possible. Maximizing the average return, thus, has the desired effect of minimizing the user effort.

The rewards function of FIG. 4 is depicted in a tabular manner, similar to the q-function with the rows enumerating the 17 possible states and the columns enumerating the 4 possible actions. From state 0, the agent action of 1 results in a reward of −10, since regardless of whether the user answers Restaurant A, Restaurant B or Restaurant C in UI 1, the user effort for these user actions is 10. From state 0, the agent action of 2 results in a reward of −2, since regardless of whether the user answers Yes or No to UI 2, the user effort for these user actions is 2. The remainder of the table in FIG. 4 can be understood in a similar fashion.

FIG. 5A depicts a first simulated episode of filling out form 102 (i.e., episode 1), and the q-function updated based on episode 1. Episode 1 starts from the initial state, $S_0$, at time index 0. Next, an agent action is simulated based on the F-greedy policy. With the q-function initialized to all zeros, the exploration policy and the greedy policy are identical (i.e., since any of the agent actions would maximize the q-function for state $S_0$), so the resulting policy is to randomly pick any of the agent actions. In the example of episode 1, a random selection of the agent action results in action 1.

Next, a user action is simulated by drawing a user action from a probability distribution. The conditional probability distribution may be defined as the probability of a user action conditioned upon at least (i) the one or more slots selected by the simulated agent action, and (ii) the user interface selected by the simulated agent action. It is understood that such a conditional probability may be generated based on historical data (e.g., by aggregating the past responses of users). In the example of FIG. 5A, suppose the conditional probability distribution is specifying "Restaurant A" with probability 0.25, specifying "Restaurant B" with probability 0.25 and specifying "Restaurant C" with probability 0.5. Further suppose that drawing from such a conditional probability distribution results in the simulated user action of specifying "Restaurant C". This user action causes the transition to state $S_2$ (i.e., recorded in the next time index, time index 1). A reward of −10 is associated with the user action of specifying "Restaurant C". Following the convention of Sutton et al., the reward associated with a user action performed in time index i is recorded in time index i+1. Therefore, the reward at time index 1 is equal to −10. Also by convention, there is no reward at time index 0, so an "x" is marked to notate the reward at time index 0 as undefined.

The remainder of episode 1 is discussed in a more concise manner. From state $S_2$, assume the simulated agent action is randomly chosen to be action 4 (again there is no difference between the exploration policy and greedy policy, as either agent action 3 or 4 would maximize the q-function). In response to being presented with UI 4, assume the drawn user action is No, causing a transition to state $S_{15}$ and the reward of −2 to be recorded at time index 2. From state $S_{15}$, assume the simulated agent action is chosen to be action 3 (this time, this is the only available agent action, based on the construction of state model 200). In response to being presented with UI 3, assume the drawn user action is "lunch", causing a transition to state $S_{10}$ and the reward of −10 to be recorded at time index 3. Since state $S_{10}$ is a terminal state, there are no further agent or user actions, as indicated by the "x's" at time index 3.

At the conclusion of the episode, the returns for each of the time indexes may be calculated as the sum of the future rewards. More precisely, the return $G_t$ at time index t (without discounting) may be calculated as $$G_t = R_{t+1} + R_{t+2} + \ldots + R_T$$

in which $R_i$ is reward at time index i, and T represents the time index at the terminal state. More generally, the return $G_t$ at time index t with discounting may be calculated as $$G_t = R_{t+1} + \gamma R_{t+2} + \ldots + \gamma^{T-1} R_T$$

in which γ is a discount factor between 0 and 1. Conceptually, discounting allows more emphasis to be put on the shorter-term rewards, rather than on the longer-term rewards. For simplicity, the example of FIG. 5A calculates the returns without discounting (or setting γ equal to 1). The return at time index 0 is calculated as the sum of −10, −2 and −10, which equals −22. The return at time index 1 is calculated as the sum of −2 and −10, which equals −12. The return at time index 2 is just the reward at the final time index, which equals −10. The return at the final time index is undefined, as indicated by the "x".

Once the returns have been computed, the q-function may be updated. The q-function is defined as the average return for a given state-agent action pair, so updating the q-function, at least for episode 1, involves storing the calculated returns at the appropriate positions in the q-function (since there are no previous returns to average with the presently calculated returns). For example, the return at time index 0 (i.e., equal to −22), corresponding to state 0 and agent action 1 is stored at the state-agent action pair (0, 1); the return at time index 1 (i.e., equal to −12), corresponding to state 2 and agent action 4 is stored at the state-agent action pair (2, 4); and the return at time index 2 (i.e., equal to −10), corresponding to state 15 and agent action 3 is stored at the state-agent action pair (15, 3). For clarity in illustration, the values of the q-function that have been updated following the simulation of episode 1 are shown with a shaded background.

FIG. 5B depicts a second simulated episode of filling out form 102 (i.e., episode 2), and the q-function updated based on episode 2. Episode 2 starts from the initial state, $S_0$, at time index 0. Next, an agent action is simulated based on the ε-greedy policy. With the q-function no longer completely populated with zeros, the exploration policy and the greedy policy may no longer be equivalent for some states, so it is necessary to specify whether the exploration policy or the greedy policy is being employed Assume that in the simulation for this particular time index of episode 2, the greedy policy is being employed. The argmax (over the agent action) of the q-function for state 0 is evaluated, which yields agent actions 2, 3, and 4. From these agent actions, one is randomly chosen, and assume that action 4 is the randomly chosen action out of actions 2, 3, and 4. In response to UI 4, assume the drawn user action is "Yes", which causes the transition to state $S_6$ and a reward of −2 to be stored at time index 1.

At this point, it can now be better appreciated how the initialization of the q-function to values larger than the "true values" encourages exploration. After episode 1, notice how the q-function for state $S_0$ was −22, 0, 0, 0 for actions 1, 2, 3, 4, respectively. Therefore, the greedy policy which takes the argmax of the q-function would select only the agent actions that had not previously been chosen (i.e., would cause the "exploration" of agent actions that had not yet been tried). On the other hand, assume that all values of the q-function had been initialized to −100. In this latter scenario, after episode 1, the q-function for state $S_0$ would have been −22, −100, −100, −100 for actions 1, 2, 3, 4, respectively. The greedy policy, in this latter scenario, would have chosen action 1 again, since action 1 is the argument that maximizes the q-function for state 0. With the initialization of the q-function to values smaller than the "true values", one can appreciate how the same agent action (i.e., action 1 in this example) would be selected repeatedly (over different episodes) if the greedy policy were repeatedly employed.

From state $S_6$, the next agent action is randomly selected between actions 1 and 2 (since the greedy policy also results in a random selection due to the identical q-values for agent actions 1 and 2 in the q-function from episode 1). Assume that agent action 2 is selected. In response to UI 2, assume the drawn user action is "Yes", which causes the transition to state $S_9$ and a reward of −2 to be stored at time index 2. Since state $S_9$ is a terminal state, there are no further agent or user actions, as indicated by the "x's" at time index 2.

The returns may be computed as follows. The return at time index 0 is the sum of −2 and −2 which equals −4. The return at time index 1 is just the reward at the final time index, which equals −2.

The q-function is updated as follows. The q-function for the state-agent action pair (0, 4) is set equal to −4 (i.e., the return at time index 0). The q-function for the state-agent action pair (6, 2) is set equal to −2 (i.e., the return at time index 1).

FIG. 5C depicts a third simulated episode of filling out the form (i.e., episode 3), and the q-function updated based on episode 3. In episode 3, the exploration policy will be carried out for all of the time steps, which will be used to introduce the concepts of an "off-policy" method of updating the q-function (as opposed to an "on-policy" method). Episode 3 starts at the initial state, $S_0$, at time index 0. Next, an agent action is simulated based on the ε-greedy policy. Assume that in the simulation for time index 0 of episode 3, the exploration policy is employed. Therefore, one of agent actions 1, 2, 3, or 4 is randomly selected, which results in the selection of agent action 1. (it is ironic that by following the exploration policy, the effect was the opposite of exploration, as exploration would have involved selecting agent actions 2 and 3 which had not yet been selected. However, after the effects of the initialization of the q-function have dissipated, it should be apparent how the random selection of an action actually encourages the exploration of the state space.) in response to UI 1, assume the drawn user action is "Restaurant C", which results in the transition to state $S_2$ and a reward of −10 to be stored at time index 1. Assume that in the simulation for time index 1 of episode 3, the exploration policy is employed again. Therefore, one of agent actions 3 or 4 is randomly selected, which results in the selection of agent action 4. In response to UI 4, assume the drawn user action is Yes, which results in the transition to state $S_9$ and a reward of −2 to be stored at time index 2. Since state $S_9$ is a terminal state, there are no further agent or user actions, as indicated by the "x's" at time index 2.

The returns may be computed as follows. The return at time index 0 is the sum of −10 and −2 which equals −12. The return at time index 1 is just the reward at the final time index, which equals −2.

At this point, the concepts of an "off-policy" and "on-policy" method of updating the q-function can be discussed. The benefit of an exploration policy is that it allows the updating of the q-function for state-agent action pairs that, if not for the exploration policy, would be left to their initialized values (e.g., 0 in this example). The convergence of the policy to the optimal policy actually requires the values of all state-agent action pairs to sufficiently converge to their true values, so it should be apparent that exploration is needed, in most cases, in order for the policy to converge to the optimal policy.

On the other hand, an unintended consequence of exploration is that it can potentially "skew" the returns. Take the following sequence of events:

time index 0: greedy agent action
time index 1: greedy agent action, Reward=−1
time index 2: exploration agent action, Reward=−2
time index 3: greedy agent action, Reward=−100
time index 4: greedy agent action, Reward=−1
time index 5: Reward=−2

The return at time index 0 equals −106 (i.e., sum of all the rewards), so such return would at least initially indicate that the agent action at time index 0 is very undesirable. However, upon accounting for the fact that the agent action at time index 2 was the result of an exploration policy and assuming that the choice of this agent action at time index 2 is extremely unlikely to occur in practice, then one could say that the exploration at time index 2 unfairly skewed the return at time index 0.

The off-policy method of updating the q-function attempts to take the benefits of the exploration policy but at the same time avoid the "skewing" of returns by only updating the q-function using returns from the time index of the last exploratory agent action and onwards. In the above sequence of events, the q-function would be updated based on the return at time index 2=−103, the return at time index 3=−3 and the return at time index 4=−2. The return at time index 2 merely indicates that the exploratory agent action at time index 2 is associated with a very poor reward, and is useful information to record in the q-function.

On the other hand, the on-policy method of updating the q-function ignores the fact that the returns may be skewed by exploratory agent action. In the on-policy method of updating the q-function, the q-function would be updated based on all computed returns (i.e., in this example, the returns computed at time indices 0-4).

Returning to the example from FIG. 5D, the q-function has been updated according to the "off-policy" method. All agent actions were based on the exploration policy, so the time index of the last agent action based on the exploration policy is time index 1. Therefore, the q-function is updated based only on the return at time index 1, and the value at state-agent action pair (2, 4) is updated as the average of the returns for this particular state-agent action pair over all episodes=the average of −12 (i.e., the return from episode 1) and −2 (i.e., the current return from episode 3)=−7. For clarity, it is noted that episode 2 was excluded from this average as no return for this particular state-agent action pair was computed for that episode.

If, however, the q-function had been updated according to the "on-policy" method, the return at time index 0 (=−12) would have also been incorporated into the q-function by updating the state-agent action pair (0, 1) to be the average of −22 (i.e., the return from episode 1) and −12 (i.e., the current return from episode 3)=−17. As should be apparent, the "on-policy" method would also include the same update as the "off-policy" method of updating the value at state-agent action pair (2, 4) to be −7.

Based on the examples from FIGS. 5A-5C, it should now be clear how the q-function is updated. Repeatedly updating of the q-function in this manner causes the q-function to converge to the optimal q-function (i.e., q*), and the greedy policy to converge to the optimal policy.

Figure 6:
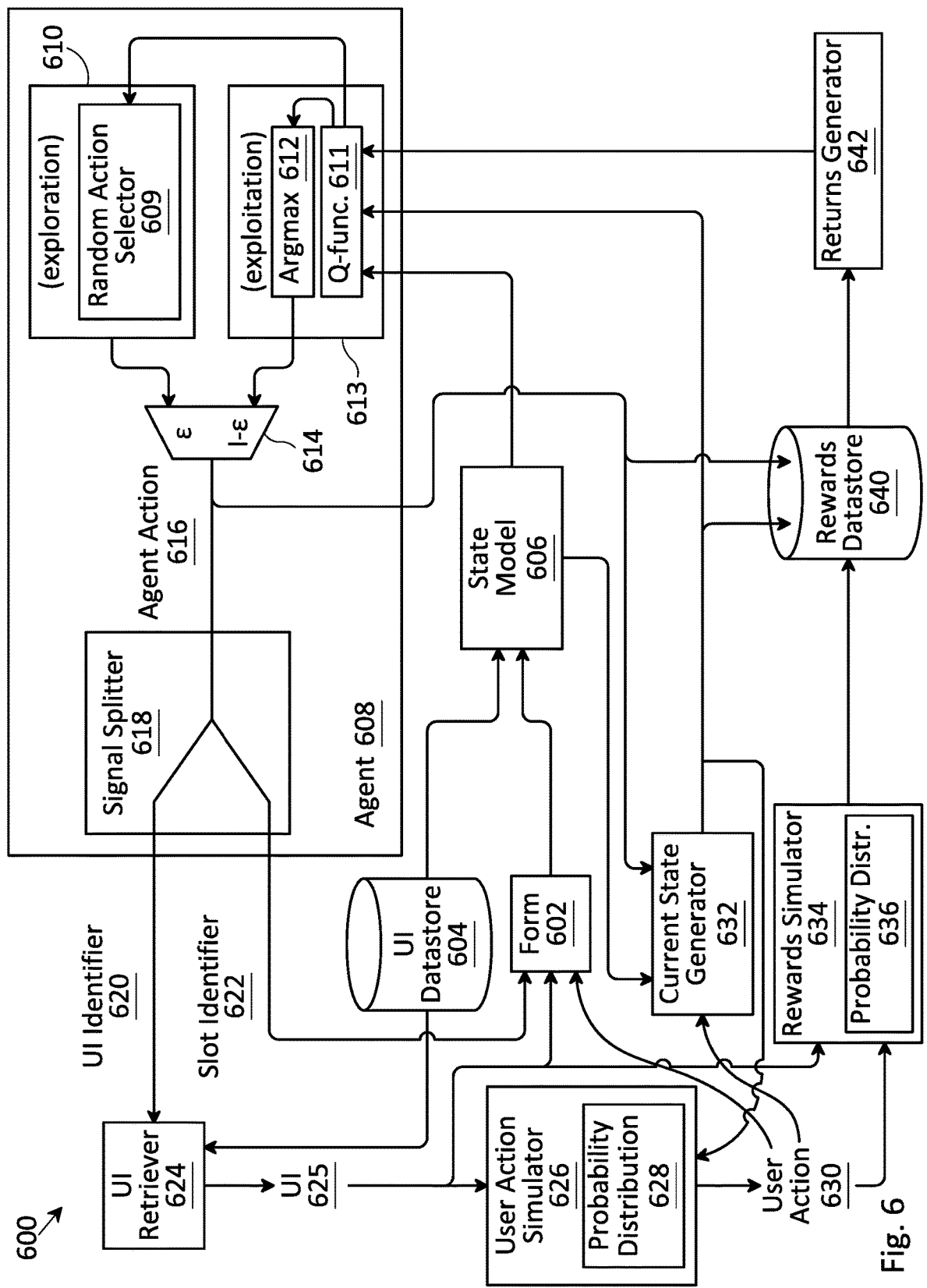
FIG. 6 depicts a block diagram of a system for determining an optimal policy, as specified by a q-function, for presenting user interfaces to fill one or more slots of a form, in accordance with one embodiment of the invention.

FIG. 6 depicts block diagram 600 of a system for determining an optimal policy, as specified by q-function 611, for automatically generating a user interface for filling one or more slots of form 602. FIG. 6 summarizes many of the concepts previously described above, so the description will be more concise.

As explained above, state model 606 may be manually or automatically generated from form 602 and UI datastore 604. In the example of FIG. 1, form 602 would correspond to form 102, and UI datastore 604 would store UIs 106a, 106b, 106c, and 106d. In the example of FIG. 2, state model 200 would correspond to state model 606. Next, q-function 611 (e.g., corresponding to the q-function depicted in FIG. 3) may be initialized based on state model 606.

Agent 608 may determine agent action 616 based on exploration policy 610 (as implemented by random action selector 609) and/or exploitation policy 613 (as implemented by q-function 611 and argmax function 612). In the instance that exploration policy 610 is employed, random action selector 609 may rely upon q-function 611 to determine the possible agent actions for a given state prior to randomly picking one of the possible agent actions. In the instance that exploitation policy 613 is employed, q-function 611 may receive the current state from current state generator 632 and argmax function 612 may determine the agent action that maximizes the q-function for the current state.

Multiplexor 614 indicates that exploration policy 610 may be followed with an ε probability while exploitation policy 613 may be followed with a 1−ε probability. It is understood that multiplexor 614 need not be implemented by an actual multiplexor component (as depicted), and instead could be implemented using a software function. Signal splitter 618 of agent 608 may split agent action 616 into UI identifier 620 (e.g., UI 1, UI 2, UI 3, and/or UI 4) and slot identifier 622 (e.g., slot 1 and/or slot 2). In general, UI identifier 620 may include one or more UI identifiers, but for simplicity in the example of FIG. 6, it is assumed that UI identifier 620 is a single UI identifier. The same is true for slot identifier 622.

Based on UI identifier 620, UI retriever 624 may retrieve UI 625 from UI datastore 604 that corresponds to UI identifier 620. Based on one or more of probability distribution 628 (which may be a conditional probability distribution), UI 625 and the current state from current state generator 632, user action simulator 626 may simulate user action 630. From the examples discussed above, it may not immediately be apparent why the current state might be used to simulate user action 630. However, a simple example can illustrate why this might be necessary. Suppose in FIG. 2 that the user has selected "No" in short form UI 2 (i.e., indicating not restaurant C). Subsequently, according to state model 200, the user would be presented with long form UI 1. Without knowledge of the current state, user action simulator 626 might randomly select a restaurant A, B or C with equal probability, but such a selection would be unrealistic as the chance for the user to reject C in UI 2 and then select C in UI 1 would be very low. Therefore, in order for the user action to be drawn in a manner that better reflects actual user behavior, probability distribution 628 may need to be conditioned upon the current state, at least in the embodiment of FIG. 6. In a subsequent embodiment (described in FIGS. 8-13), such complication is handled in another manner.

Form 602 may be updated based on user action 630, UI 625 and slot identifier 622. If user action 630 specifies a slot value, the slot of form 602 as specified by slot identifier 622 may be updated with the specified slot value, while if user action 630 merely excludes some slot values, form 602 may not be updated. In some instances, user action 630 and UI 625 may both be needed to infer a slot value. For example, it may not be possible to arrive at any slot value based on the user action of "Yes" alone, but it may be possible to arrive at the slot value of "Restaurant C" based on the user action of "Yes" and UI 106b. During the training phase, the updating of form 602 may not be necessary if current state 632 is a sufficiently complete representation of the current state.

The current state may be updated by current state generator 632 (equivalent to the determination of the next state) based on user action 630, agent action 616, and state model 606. In state model 200 of FIG. 2, one may recall how the determination of the next state was based on the current state, the agent action, the user action, and the state model 200 itself.

Based on one or more of UI 625, user action 630, and probability distribution 636, rewards simulator 634 may simulate a reward for the time index following the time index of the current agent action and user action. Conceptually, it makes sense that rewards simulator 634 might receive UI 625, as a UI with many words might result in more user effort and accordingly a lower reward, whereas a UI with fewer words might result in less user effort and accordingly a higher reward. Conceptually, it also makes sense that rewards simulator 634 might receive user action 630, as a single mouse click may require less user effort and accordingly result in a higher reward, whereas the typing of a long string of characters (e.g., the typing of a user's address) may require more user effort and accordingly result in a lower reward. Accordingly, probability distribution 636 may be a conditional probability distribution, and the reward may be drawn from probability distribution 636 based on the input derived from UI 625 (e.g., number of words in UI) and user action 630 (e.g., number of keystrokes). If a deterministic rewards function were used, such as that depicted in FIG. 4, rewards simulator 634 may also create a rewards function directly from the rewards stored in state model 606 (although a connection between rewards simulator 634 and state model 606 has been omitted for simplicity in FIG. 6).

The reward associated with each time index may be stored in rewards datastore 640. In an efficient implementation, the reward at time index i may be stored along with the state at time index i and the agent action at time index i, in order to simplify the updating of q-function 611.

Returns generator 642 may compute the return for each time index based on the rewards stored in rewards datastore 640, and provide the return for each time index to q-function 611. In an efficient implementation, each return may be provided along with its associated state-agent action pair so that q-function 611 may be readily updated based on the return for each state-agent action pair.

Figure 7:
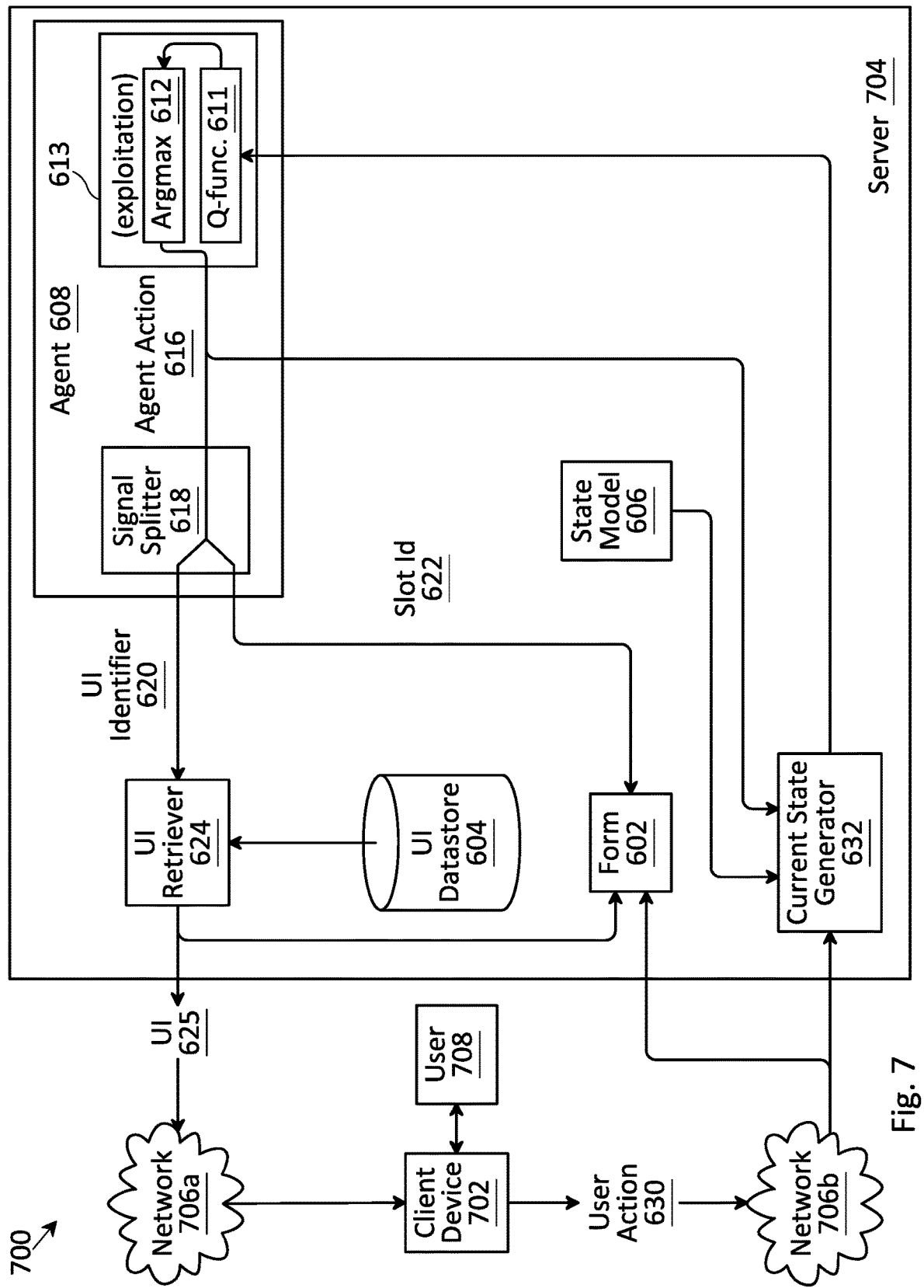
FIG. 7 depicts a block diagram of a system for assisting a user to fill one or more slots of a form, in accordance with one embodiment of the invention.

FIG. 7 depicts block diagram 700 of a system for automatically generating a user interface for a user to fill in a form based on the optimal policy determined in the system of FIG. 6 (i.e., in FIG. 7, it is assumed the q-function has already sufficiently converged to q*). FIG. 7 includes client device 702 communicatively coupled to server 704 via networks 706a and 706b. Networks 706a and 706b may be any form of communications means and, in some cases, may be individual communications links, or one or more communications networks, including private networks, public networks, and/or virtual private networks over public networks. While depicted as two separate networks 706a and 706b for ease of illustration, it is understood that networks 706a and 706b may be parts of a single network or network of networks. User 708 may use client device 702 to fill one or more slots of form 602, and more specifically, may use the one or more user interfaces presented by client device 702 to fill one or more slots of form 602.

In FIG. 7, agent 608 may determine agent action 616 based on exploitation policy 613. More specifically, q-function 611 may receive the current state from current state generator 632, and argmax function 612 may select the agent action that maximizes the q-function for the current state. Signal splitter 618 may split agent action 616 into UI identifier 620 and slot identifier 622. UI retriever 624 may retrieve UI 625 from UI datastore 604 based on UI identifier 620. Client device 702 may receive UI 625 from UI retriever 624 via network 706a. User 708 may submit user action 630 via client device 702 in response to UI 625. User action 630 may be received by server 704 via network 706b.

Slot identifier 622, UI 625 and user action 630 may be used to update one or more slots of form 602. As noted above, in some instances, user action 630 (in conjunction with UI 625) may uniquely specify one or more slot values, in which case one or more slots of form 602, as identified by slot identifier 622, can be filled in. However, in other instances, a user action 630 may not uniquely specify one or more slot values, in which case the user action would not (at least immediately) result in the slots of form 602 being filled.

User action 630, agent action 616 and state model 606 may be used by current state generator 634 to update the current state. The process may then continue to iterate with agent 608 determining the next agent action 616 from q-function 611 and the current state, until form 602 has been completely filled. One may observe that one difference between FIGS. 6 and 7 is that user 708 is present in FIG. 7 instead of user action simulator 626. One may also observe that the monitoring of rewards, the determination of returns based on the rewards, and the updating of the q-function based on the returns is not present in FIG. 7. On the other hand, if it is expected that the environment is non-stationary (e.g., user behavior changes over time, popularity of restaurants changes over time, etc.), FIG. 7 could be modified to incorporate the components from FIG. 6 (e.g., 634, 640, 642) that are needed for the updating of the q-function.

In the description below, a variant of the processes above is described in which the slot value is drawn after the selection of the agent action, and the user action is drawn based on the drawn slot value. Such an approach has the advantage that the slot value may be drawn in accordance with an empirically-arrived probability distribution for the slot values. More specifically, the empirically-arrived probability distribution may incorporate statistics regarding how frequently particular slot values were selected by a user (or a group of users) for a particular slot. For ease of description, the instant process, with the user action drawn based on the drawn slot value, will be described in the context of FIGS. 8-13, rather than in the context of FIG. 1-7.

FIG. 8 depicts an example form 802 and two user interfaces 804a, 804b for filling the slot of form 802. For simplicity, form 802 only has a single slot that accepts the choice of restaurant A, B, or C. Long form UI 804a allows the user to specify one of restaurants A, B, and C. Short form UI 804b is different from the short form interfaces previously discussed. While the short form UI 804b only presents one of the slot values (i.e., restaurant C), it imposes fewer restrictions on the answer that the user may specify (as opposed to the radio buttons for UIs 106b and 106d). Short form UI 804b may be more suitable for the chat context, in which the user may specify "Yes", "No", but also may specify additional information that is not specifically requested by the UI, such as "No, I want B" or "No, I want A".

Figure 9:
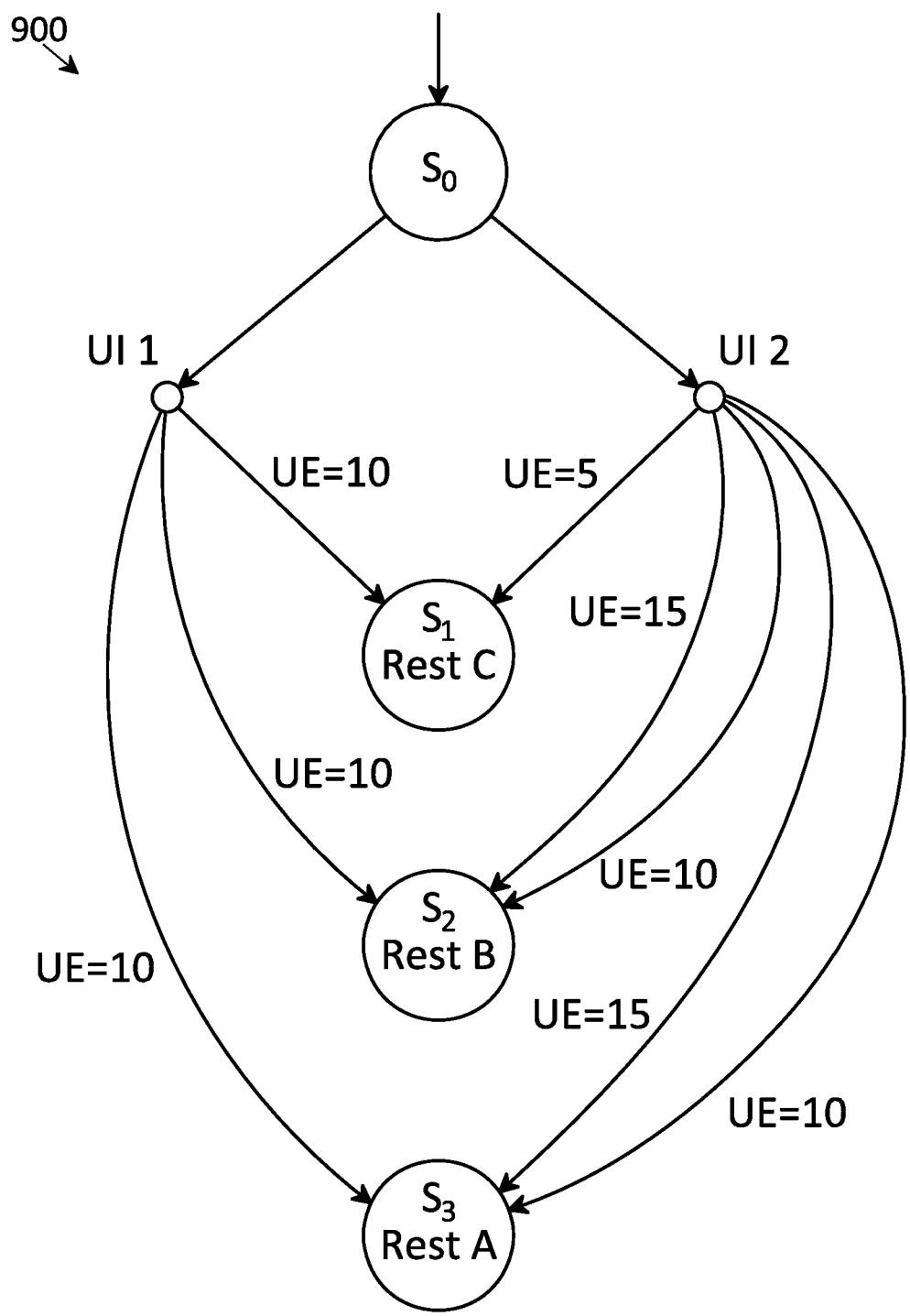
FIG. 9 depicts a state model of a process to fill the form depicted in FIG. 8, in accordance with one embodiment of the invention.

FIG. 9 depicts state model 900 of a process to fill the form depicted in FIG. 8. In contrast to state model 200 from FIG. 2, every state of state model 900 (other than the initial state $S_0$) corresponds to a particular selection of slot values. State $S_1$ corresponds to the selection of slot value "Restaurant C"; $S_2$ corresponds to the selection of slot value "Restaurant B"; and $S_3$ corresponds to the selection of slot value "Restaurant A". Similar to state model 200, each agent action is the pairing of one slot with one user interface. However, since there is only one slot in form 802 (for simplicity), each agent action may simply correspond to the selected user interface.

Accordingly, from the initial state, $S_0$, two agent actions are possible (i.e., display UI 1 or display UI 2). For simplicity, the display of UI 1 may be referred to as action 1, and the display of UI 2 may be referred to as action 2. If action 1 were taken (i.e., display UI 1), three user actions are possible (e.g., Restaurant A, Restaurant B, or Restaurant C). The user specifying "Restaurant C" leads to state $S_1$ (Restaurant C); the user specifying "Restaurant B" leads to state $S_2$ (Restaurant B); and the user specifying "Restaurant A" leads to state $S_3$ (Restaurant A). The user effort associated with each of these user actions is 10, similar to state model 200.

If action 2 were taken (i.e., display UI 2), five user actions are possible, with some of these user actions being "compound user actions" (i.e., user actions in response to multiple UIs). The user specifying "Yes" leads to state $S_1$ (Restaurant C), and is associated with a user effort of 5. The user specifying "No, I want B" leads to state $S_2$ (Restaurant B), and is associated with a user effort of 10. The user specifying "No, I want A" leads to state $S_3$ (Restaurant A), and is associated with a user effort of 10. It is also possible, however, for the user to perform a compound user action such as specifying "No" in UI 2, and then, in response to UI 1, specifying "Restaurant B". In contrast to state model 200, such a compound user action is drawn as a single arrow from UI 2 to state $S_2$, even though the compound user action involved UI 1. The user effort associated with this compound action is 15, calculated as 5+10, 5 from using UI 2 and 10 from using UI 1. Similarly, a compound user action is indicated by the arrow with user effort 15 from UI 2 to state $S_3$ (Restaurant A), and represents the user specifying "No" in UI 2, and then, in response to UI 1, specifying "Restaurant A".

FIG. 10 depicts an initialization of a q-function corresponding to the state model of FIG. 9. Based on state model 900, there are only two valid state-agent action pairs: (0, 1) and (0, 2). The valid state-agent action pairs have been initialized to 0, and the invalid state-agent action pairs have been marked with "x's".

FIG. 11 depicts a rewards function corresponding to the state model of FIG. 9.

For the state-agent action pair (0, 1), the user effort is always 10, so the reward is also −10 (utilizing the same inverse relationship between the user effort and the reward described above). For the state-agent action pair (0, 2), the user efforts of 5, 10, and 15 are possible, so the possible rewards are −5, −10, and −15.

FIG. 12A depicts a first simulated episode (i.e., episode 1) of filling out form 802, and the q-function updated based on episode 1. Episode 1 starts from initial state, $S_0$, at time index 0. Next, an agent action is simulated based on the F-greedy policy. With the q-function initialized to all zeros, the exploration policy and the greedy policy are identical (i.e., since any of the agent actions would maximize the q-function for state $S_0$), so the resulting policy is to randomly pick any of the agent actions. In the example of episode 1, a random selection of the agent actions results in action 1.

In a, deviation from the simulation process described in FIGS. 5A-C, the next step in simulating the episode in FIG. 12 is to draw a slot value corresponding to the slot selected by the agent action. In the present case, there is only one slot, so it was known beforehand that the slot value would be drawn for slot 1. However, in the general case, the agent action will determine the slot for which the slot value is to be drawn. The slot value may be drawn from a conditional probability distribution, defining the probability of a particular slot value, given a particular slot. As explained above, the advantage of first drawing the slot value before drawing the user action is that the slot values may be drawn in accordance with an empirically based conditional probability distribution. In the particular example of FIG. 12A, assume that the drawn slot value is "Restaurant B". If not already apparent, such drawn slot value determines the next state (i.e., $S_2$), since, by design, the states in state model 900 were constructed to represent the previously drawn slot values.

The next step will be to either infer or draw the user action based on the drawn slot value and state model 900. Since there is only one possible user action that can result in state $S_2$ from agent action 1 (i.e., only one arrow connecting UI 1 and state $S_2$ in state model 900), the user action can be inferred to be the action of "specifying B" in UI 1. Following the convention of Sutton et al., the reward of −10 is recorded in the next time index (i.e., time index 1). Since state $S_2$ is a terminal state, the simulation of episode 2 concludes without any further agent or user actions.

The return at time index 0 is the reward at time index 1, which equals −10. The q-function is then updated based on the computed returns. In the instant example, only one return was computed, so there is only one update to the q-function of setting the value at state-agent action pair (0, 1) equal to −10.

FIG. 12B depicts a second simulated episode (i.e., episode 2) of filling out form 802, and the q-function updated based on episode 2. Episode 2 starts from the initial state, $S_0$, at time index 0. Next, an agent action is simulated based on the ε-greedy policy. Assume that the greedy policy is the selected option of the c-greedy policy. The greedy policy will evaluate the argmax of the q-function for state $S_0$ (refer to the q-function updated in episode 1 that is depicted in FIG. 12A for this evaluation), which results in the determination of agent action 2.

Next, the slot value is drawn for the slot selected by the agent action (i.e., slot 1). Assume that the drawn slot value is again "Restaurant B", which causes the transition to state $S_2$ (Restaurant B). The next step will be to either infer or draw the user action based on the drawn slot value and state model 606, Since there are two possible user actions that can result in state $S_2$ from agent action 2 (i.e., two arrows connecting UI 2 and state $S_2$ in state model 900), the user action will need to be drawn from a probability distribution. More specifically, the probability distribution may be a conditional probability distribution, and that conditional probability distribution may be defined as the probability of a user action (which may include a compound user action) conditioned upon the slot selected by the simulated agent action, the user interface selected by the simulated agent action, and the drawn slot value. Such a conditional probability may be generated based on historical data (e.g., past responses from actual users). Assume in the instant example that the drawn user action is specifying "No" in UI 2, followed by specifying "Restaurant B" in UI 1. Such compound user action has a reward of −15, so the reward of −15 is stored at time index 1. Since state $S_2$ is a terminal state, the simulation of episode 2 concludes without any further agent or user actions.

The return at time index 0 is the reward at time index 1, which equals −15. The q-function is then updated based on the computed returns. In the instant example, only one return was computed, so there is only one update to the q-function of setting the value at state-agent action pair (0, 2) equal to −15. Such a process of simulating an episode and updating the q-function may continue until the q-function sufficiently converges.

Figure 13:
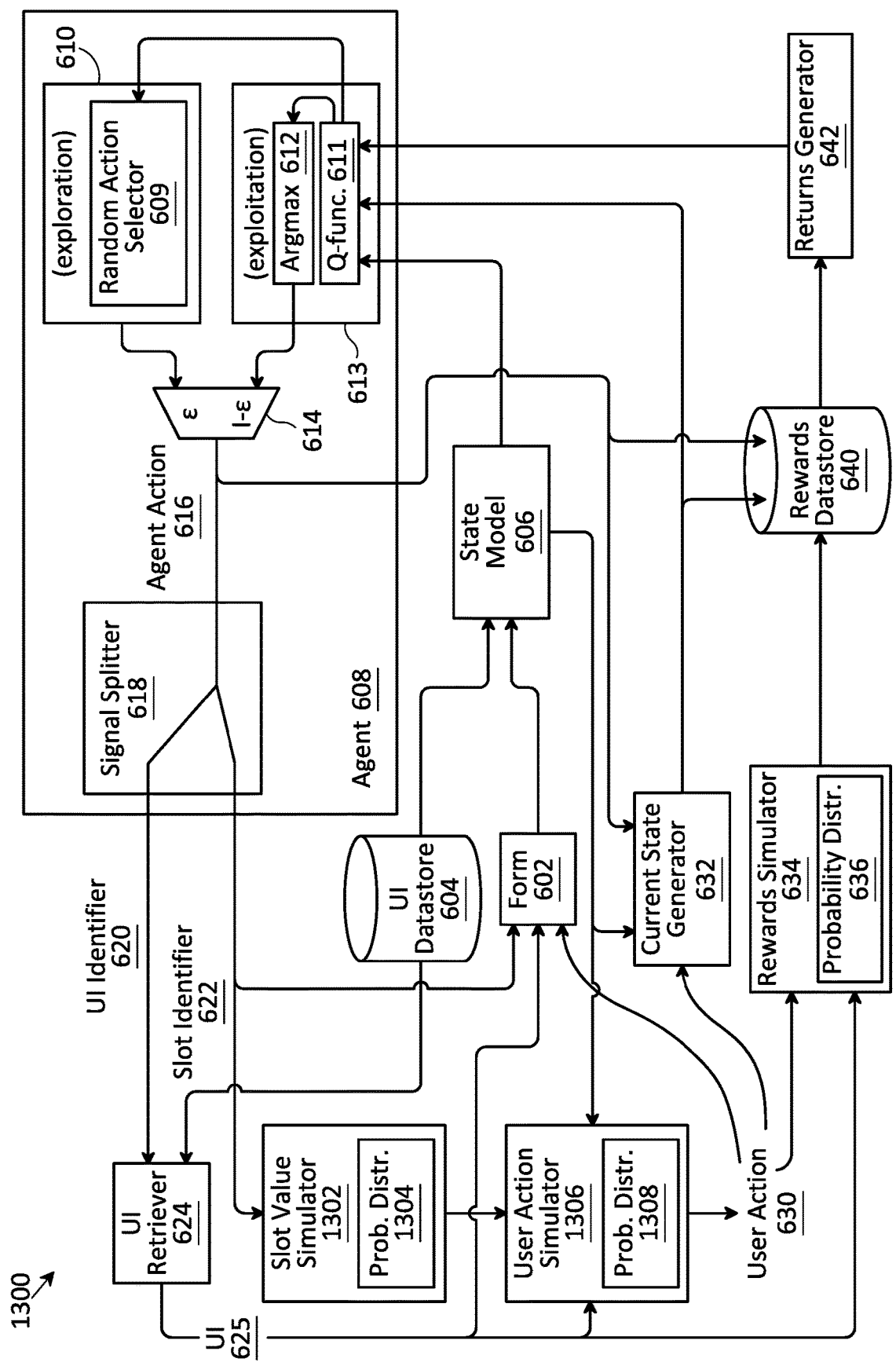
FIG. 13 depicts a block diagram of a system for determining an optimal policy, as specified by a q-function, for presenting user interfaces to fill one or more slots of a form, in accordance with one embodiment of the invention.

FIG. 13 depicts block diagram 1300 of a system for determining an optimal policy, as specified by a q-function, for automatically generating a user interface for filling one or more slots of a form. Many components of block diagram 1300 are identical to those depicted in block diagram 600 so for conciseness the description of identical components will not be repeated. It is understood that in the context of the FIG. 13, form 602 may refer to form 802 depicted in FIG. 8, UI 804a and 804b may be stored in UI datastore 604, and state model 606 may refer to state model 900 depicted in FIG. 9. Also q-function 611 may refer to the q-functions depicted in FIGS. 10 and 12A-B. The two new and/or different components in block diagram 1300 are slot value simulator 1302 and user action simulator 1306.

Based on slot identifier 622 and probability distribution 1304, slot value simulator 1302 may simulate a slot value. As described above, probability distribution 1304 may be a conditional probability distribution, defined as the probability of a slot value conditioned upon the slot selected by the simulated agent action. More generally, if the simulation agent action selects multiple slots, probability distribution 1304 may provide a joint probability of multiple slot values, conditioned upon the multiple slots selected by the simulated agent action.

Based on one or more of the simulated slot value, user interface 625, state model 606 and probability distribution 1308, user action simulator 1306 may generate user action 630. As described above, probability distribution 1308 may be the probability of a user action (which may include a compound user action) conditioned upon the slot selected by the simulated agent action, the user interface selected by the simulated agent action, and the drawn slot value.

Once q-function 611 has sufficiently converged in the system represented by block diagram 1300 of FIG. 13, the system depicted in FIG. 7 may be used by a user to fill one or more slots of a form. Continuing the example from FIG. 13, it is understood that form 602 would refer to form 802 (rather than form 102); UIs 804a and 804b would be stored in UI datastore 604; state model 606 would refer to state model 900 (rather than state model 200); etc.

Figure 14:
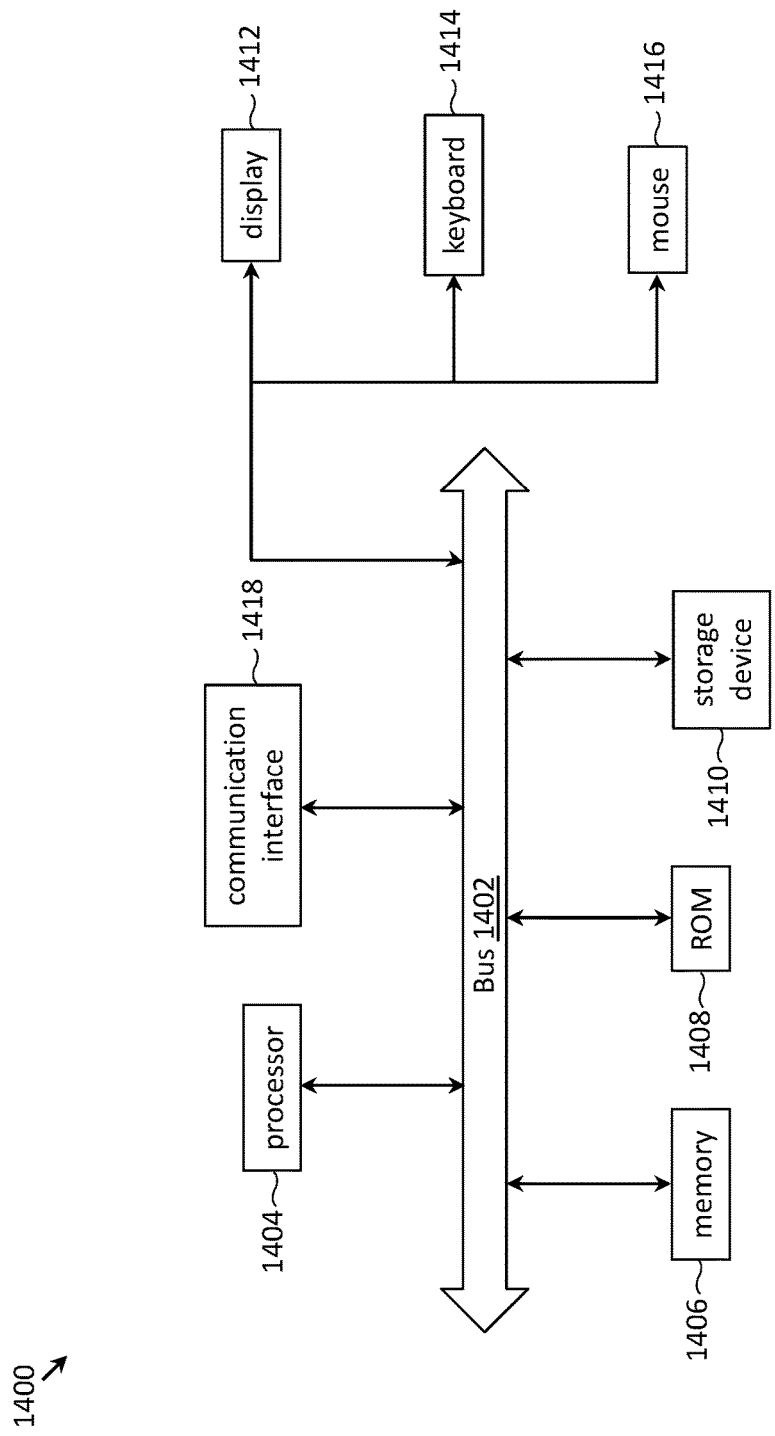
FIG. 14 depicts components of a computer system in which computer readable instructions instantiating the methods of the present invention may be stored and executed.

As is apparent from the foregoing discussion, aspects of the present invention involve the use of various computer systems and computer readable storage media having computer-readable instructions stored thereon. FIG. 14 provides an example of a system 1400 that may be representative of any of the computing systems (e.g., client device 702, server 704) discussed herein. Examples of system 1400 may include a smartphone, a desktop computer, a laptop computer, a mainframe computer, an embedded system, etc. Note, not all of the various computer systems have all of the features of system 1400. For example, certain ones of the computer systems discussed above may not include a display inasmuch as the display function may be provided by a client computer communicatively coupled to the computer system or a display function may be unnecessary. Such details are not critical to the present invention.

System 1400 includes a bus 1402 or other communication mechanism for communicating information, and a processor 1404 coupled with the bus 1402 for processing information. Computer system 1400 also includes a main memory 1406, such as a random access memory (RAM) or other dynamic storage device, coupled to the bus 1402 for storing information and instructions to be executed by processor 1404. Main memory 1406 also may be used for storing temporary variables or other intermediate information during execution of instructions to be executed by processor 1404. Computer system 1400 further includes a read only memory (ROM) 1408 or other static storage device coupled to the bus 1402 for storing static information and instructions for the processor 1404. A storage device 1410, for example a hard disk, flash memory-based storage medium, or other storage medium from which processor 1404 can read, is provided and coupled to the bus 1402 for storing information and instructions (e.g., operating systems, applications programs and the like).

Computer system 1400 may be coupled via the bus 1402 to a display 1412, such as a flat panel display, for displaying information to a computer user. An input device 1414, such as a keyboard including alphanumeric and other keys, may be coupled to the bus 1402 for communicating information and command selections to the processor 1404. Another type of user input device is cursor control device 1416, such as a mouse, a trackpad, or similar input device for communicating direction information and command selections to processor 1404 and for controlling cursor movement on the display 1412. Other user interface devices, such as microphones, speakers, etc. are not shown in detail but may be involved with the receipt of user input and/or presentation of output.

The processes referred to herein may be implemented by processor 1404 executing appropriate sequences of computer-readable instructions contained in main memory 1406. Such instructions may be read into main memory 1406 from another computer-readable medium, such as storage device 1410, and execution of the sequences of instructions contained in the main memory 1406 causes the processor 1404 to perform the associated actions. In alternative embodiments, hard-wired circuitry or firmware-controlled processing units may be used in place of or in combination with processor 1404 and its associated computer software instructions to implement the invention. The computer-readable instructions may be rendered in any computer language.

In general, all of the above process descriptions are meant to encompass any series of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying", "receiving", "transmitting" or the like, refer to the action and processes of an appropriately programmed computer system, such as computer system 1400 or similar electronic computing device, that manipulates and transforms data represented as physical (electronic) quantities within its registers and memories into other data similarly represented as physical quantities within its memories or registers or other such information storage, transmission or display devices.

Computer system 1400 also includes a communication interface 1418 coupled to the bus 1402. Communication interface 1418 may provide a two-way data communication channel with a computer network, which provides connectivity to and among the various computer systems discussed above. For example, communication interface 1418 may be a local area network (LAN) card to provide a data communication connection to a compatible LAN, which itself is communicatively coupled to the Internet through one or more Internet service provider networks. The precise details of such communication paths are not critical to the present invention. What is important is that computer system 1400 can send and receive messages and data through the communication interface 1418 and in that way communicate with hosts accessible via the Internet. It is noted that the components of system 1400 may be located in a single device or located in a plurality of physically and/or geographically distributed devices.

Thus, systems and methods for configuring a software application so as to minimize the effort of the user when using the software application to fill fields or slots of a form have been described. It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method for generating an optimal policy for configuring a form filling application that assists a user to fill one or more slots of a form, the method comprising:
defining a plurality of actions of an agent, wherein each agent action specifies one or more slots of the form for the user to fill and specifies one or more user interfaces for the user to use to fill the one or more slots specified by the agent action;
defining a state model of a process to fill one or more slots of the form, wherein each state of the state model includes information that is accessible to the agent at a certain point in time during the form filling process;

defining a q-function as a mapping from state-agent action pairs to values, wherein each of the values is defined as an average return for the state-agent action pair;

initializing the q-function;

simulating an episode of filling out the form, wherein simulating the episode comprises:

- simulating, at time index i, an agent action that is performed from a state at time index i, the state and simulated agent action forming a state-agent action pair;
- simulating, at time index i, a user action that is performed in response to the simulated agent action, the simulated agent action and the user action causing a transition from the state at time index i to a state at time index i+1;
- simulating, at time index i+1, a reward that reflects a measure of user effort that is associated with the user performing the simulated user action on the user interface specified by the simulated agent action; and
- if the state at time index i+1 is not a terminal state, repeating the simulation of the agent action, the user action and the reward from the state at time index i+1, otherwise if the state at time index i+1 is a terminal state, concluding the simulation of the episode;

for each state-agent action pair that is simulated in the episode, calculating a return of the state-agent action pair based on the rewards recorded from the simulation of the episode;

updating the q-function based on one or more of the returns calculated during the simulation of the episode; and repeating the process of simulating an episode, calculating returns, and updating the q-function until values of the q-function sufficiently converge, wherein the optimal policy for configuring the form filling application that assists the user to fill one or more slots of the form comprises a greedy policy, in which, for a given state, an agent action is selected that maximizes the q-function for the given state.

2. The method of claim 1, wherein at least one of the states specifies one or more of information regarding a client device of the user or an interface type preferred by the user, wherein the interface type includes one or more of chat interface or a web-based interface.

3. The method of claim 1, wherein the agent action that is simulated, at time index i, during the simulation of the episode is chosen in accordance with an ε-greedy policy, wherein, with a probability of ε, the ε-greedy policy randomly selects an agent action from a plurality of possible agent actions, and with a probability of 1−ε, the ε-greedy policy selects an agent action in accordance with the greedy policy.

4. The method of claim 1, wherein simulating the one or more user actions, at time index i, comprises drawing a user action from a probability distribution.

5. The method of claim 4, wherein the conditional probability distribution is defined as the probability of a user action, conditioned upon at least (i) the one or more slots selected by the simulated agent action, and (ii) the user interface selected by the simulated agent action.

6. The method of claim 1, wherein simulating the reward, at time index i+1, comprises drawing a reward from a conditional probability distribution.

7. The method of claim 6, wherein the conditional probability distribution is defined as the probability of a reward, conditioned upon at least (i) the one or more slots selected by the simulated agent action and (ii) the user interface selected by the simulated agent action.

8. A method for generating an optimal policy for configuring a form filling application that assists a user to fill one or more slots of a form, the method comprising:

defining a plurality of actions of an agent, wherein each agent action specifies one or more slots of the form for the user to fill and specifies one or more user interfaces for the user to use to fill the one or more slots specified by the agent action;

defining a state model of a process to fill one or more slots of the form, wherein each state of the state model includes information that is accessible to the agent at a certain point in time during the form filling process;

defining a q-function as a mapping from state-agent action pairs to values, wherein each of the values is defined as an average return for a corresponding state-agent action pair;

initializing the q-function;

simulating an episode of filling out the form, wherein simulating the episode comprises:

- simulating, at time index i, an agent action that is performed from a state, the state and simulated agent action forming a state-agent action pair;
- simulating, at time index i, a slot value for a slot selected by the agent action;
- simulating, at time index i, one or more user actions that are performed so as to transition from the simulated agent action at time index i to a state at time index i+1 that is specified by the simulated slot value;
- simulating, at time index i+1, a reward that reflects a measure of user effort that is associated with a user performing the one or more simulated user actions; and
- if the state at time index i+1 is not a terminal state, incrementing the time index i, and repeating the simulation of the agent action, the slot value, the user action and the reward from the state at time index i+1, otherwise if the state at time index i+1 is a terminal state, concluding the simulation of the episode;

for each state-agent action pair that is simulated in the episode, computing a return of the state-agent action pair based on the rewards simulated during the episode;

updating the q-function based on one or more of the computed returns; and repeating the process of simulating an episode, computing returns, and updating the q-function until values of the q-function sufficiently converge, wherein the optimal policy for configuring the form filling application that assists the user to fill one or more slots of the form comprises a greedy policy, in which, for a given state, an agent action is selected that maximizes the q-function for the given state.

9. The method of claim 8, wherein at least one of the states specifies one or more of information regarding a client device of the user or an interface type preferred by the user, wherein the interface type includes one or more of chat interface or a web-based interface.

10. The method of claim 8, wherein the agent action that is simulated, at time index i, during the simulation of the episode is chosen in accordance with an ε-greedy policy, wherein, with a probability of ε, the agent randomly selects an agent action from a plurality of possible agent actions, and with a probability of 1−ε, the agent selects an agent action in accordance with the greedy policy.

11. The method of claim 8, wherein simulating the slot value, at time index i, comprises drawing a slot value from a conditional probability distribution.

12. The method of claim 11, wherein the conditional probability distribution is defined as the probability of a slot value, conditioned upon at least the slot selected by the simulated agent action.

13. The method of claim 8, wherein simulating the one or more user actions, at time index i, comprises inferring a user action that, if performed on the user interface selected by the simulated agent action at time index i, would result in the slot value drawn at time index i.

14. The method of claim 8, wherein simulating the one or more user actions, at time index i, comprises drawing a user action from a probability distribution that, if performed on the user interface selected by the simulated agent action at time index i, would result in the slot value drawn at time index i.

15. The method of claim 14, wherein the conditional probability distribution is defined as the probability of a user action, conditioned upon at least (i) the one or more slots selected by the simulated agent action, (ii) the user interface selected by the simulated agent action, and (iii) the slot value drawn at time index i.

16. The method of claim 8, wherein simulating the reward, at time index i+1, comprises drawing a reward from a conditional probability distribution.

17. The method of claim 16, wherein the conditional probability distribution is defined as the probability of a reward, conditioned upon at least (i) the one or more slots selected by the simulated agent action and (ii) the user interface selected by the simulated agent action.

18. A system for generating an optimal policy for configuring a form filling application that assists a user to fill one or more slots of a form, the system comprising a processor configured to perform the steps of:
- defining a plurality of actions of an agent, wherein each agent action specifies one or more slots of the form for the user to fill and specifies one or more user interfaces for the user to use to fill the one or more slots specified by the agent action;
- defining a state model of a process to fill one or more slots of the form, wherein each state of the state model includes information that is accessible to the agent at a certain point in time during the form filling process;
- defining a q-function as a mapping from state-agent action pairs to values, wherein each of the values is defined as an average return for a corresponding state-agent action pair;
- initializing the q-function;
- simulating an episode of filling out the form, wherein simulating the episode comprises:
  - simulating, at time index i, an agent action that is performed from a state, the state and simulated agent action forming a state-agent action pair;
  - simulating, at time index i, a slot value for a slot selected by the agent action;
  - simulating, at time index i, one or more user actions that are performed so as to transition from the simulated agent action at time index i to a state at time index i+1 that is specified by the simulated slot value;
  - simulating, at time index i+1, a reward that reflects a measure of user effort that is associated with the user performing the one or more simulated user actions; and
  - if the state at time index i+1 is not a terminal state, incrementing the time index i, and repeating the simulation of the agent action, the slot value, the user action and the reward from the state at time index i+1;
- for each state-agent action pair that is simulated in the episode, computing a return of the state-agent action pair based on the rewards simulated during the episode;
- updating the q-function based on one or more of the computed returns; and
- repeating the process of simulating an episode, computing returns, and updating the q-function until values of the q-function sufficiently converge,
wherein the optimal policy for configuring the form filling application that assists the user to fill one or more slots of the form comprises a greedy policy, in which, for a given state, an agent action is selected that maximizes the q-function for the given state.

19. The system of claim 18, wherein simulating the slot value, at time index i, comprises drawing a slot value from a conditional probability distribution.

20. The system of claim 19, wherein the conditional probability distribution is defined as the probability of a slot value, conditioned upon at least the slot selected by the simulated agent action.

* * * * *